(12) United States Patent
Soma et al.

(10) Patent No.: US 8,301,124 B2
(45) Date of Patent: Oct. 30, 2012

(54) INFORMATION PROCESSING APPARATUS AND METHOD AND PROGRAM

(75) Inventors: Isao Soma, Saitama (JP); Naoki Miyabayashi, Tokyo (JP); Yoshihiro Yoneda, Kanagawa (JP); Seiji Kuroda, Kanagawa (JP); Yasuharu Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 12/365,379

(22) Filed: Feb. 4, 2009

(65) Prior Publication Data

US 2009/0221271 A1    Sep. 3, 2009

(30) Foreign Application Priority Data

Feb. 29, 2008    (JP) ................................. 2008-049739

(51) Int. Cl.
*H04M 3/42*    (2006.01)
(52) U.S. Cl. .................. 455/414.1; 455/552.1; 455/41.2
(58) Field of Classification Search ........ 455/41.1–41.2, 455/552.1, 414.1
See application file for complete search history.

(56) References Cited

U.S. PATENT DOCUMENTS

| | | | |
|---|---|---|---|
| 7,471,200 B2 * | 12/2008 | Otranen ..................... | 340/572.1 |
| 7,684,834 B2 * | 3/2010 | Kangas et al. ................ | 455/574 |
| 2006/0293909 A1 | 12/2006 | Miyajima et al. | |
| 2007/0073929 A1 * | 3/2007 | Takayama et al. .............. | 710/51 |
| 2009/0111378 A1 * | 4/2009 | Sheynman et al. .......... | 455/41.1 |

FOREIGN PATENT DOCUMENTS

| | | |
|---|---|---|
| JP | 2002-359623 | 12/2002 |
| JP | 2003-85659 | 3/2003 |
| JP | 2004-364145 | 12/2004 |
| JP | 2005-167946 | 6/2005 |
| JP | 2006-285716 | 10/2006 |
| JP | 2007-67655 | 3/2007 |
| WO | WO 2006064480 A1 * | 6/2006 |
| WO | WO 2006/082861 A1 | 8/2006 |

OTHER PUBLICATIONS

U.S. Appl. No. 12/562,711, filed Sep. 18, 2009, Yoneda, et al.
U.S. Appl. No. 12/561,504, filed Sep. 17, 2009, Yoneda, et al.

* cited by examiner

*Primary Examiner* — David Q Nguyen
(74) *Attorney, Agent, or Firm* — Oblon, Spivak, McClelland, Maier & Neustadt, L.L.P.

(57) ABSTRACT

An information processing apparatus for communicating with a different information processing apparatus, includes: a first connection establishment block configured to control a first communication section, which carries out nearby wireless communication for delivering and accepting information to and from the different information processing apparatus positioned near to the information processing apparatus, to establish a connection for the nearby wireless communication; an acquisition block configured to acquire setting information for short range wireless communication which exhibits a wire communication range than the nearby wireless communication and capability information regarding the capacity of the different information processing apparatus from the different information processing apparatus through the nearby wireless communication; and a second connection establishment block configured to control a second communication section, which carries out the short range wireless communication, based on the setting information and the capability information to establish a connection for the short range wireless communication.

12 Claims, 25 Drawing Sheets

F I G . 2
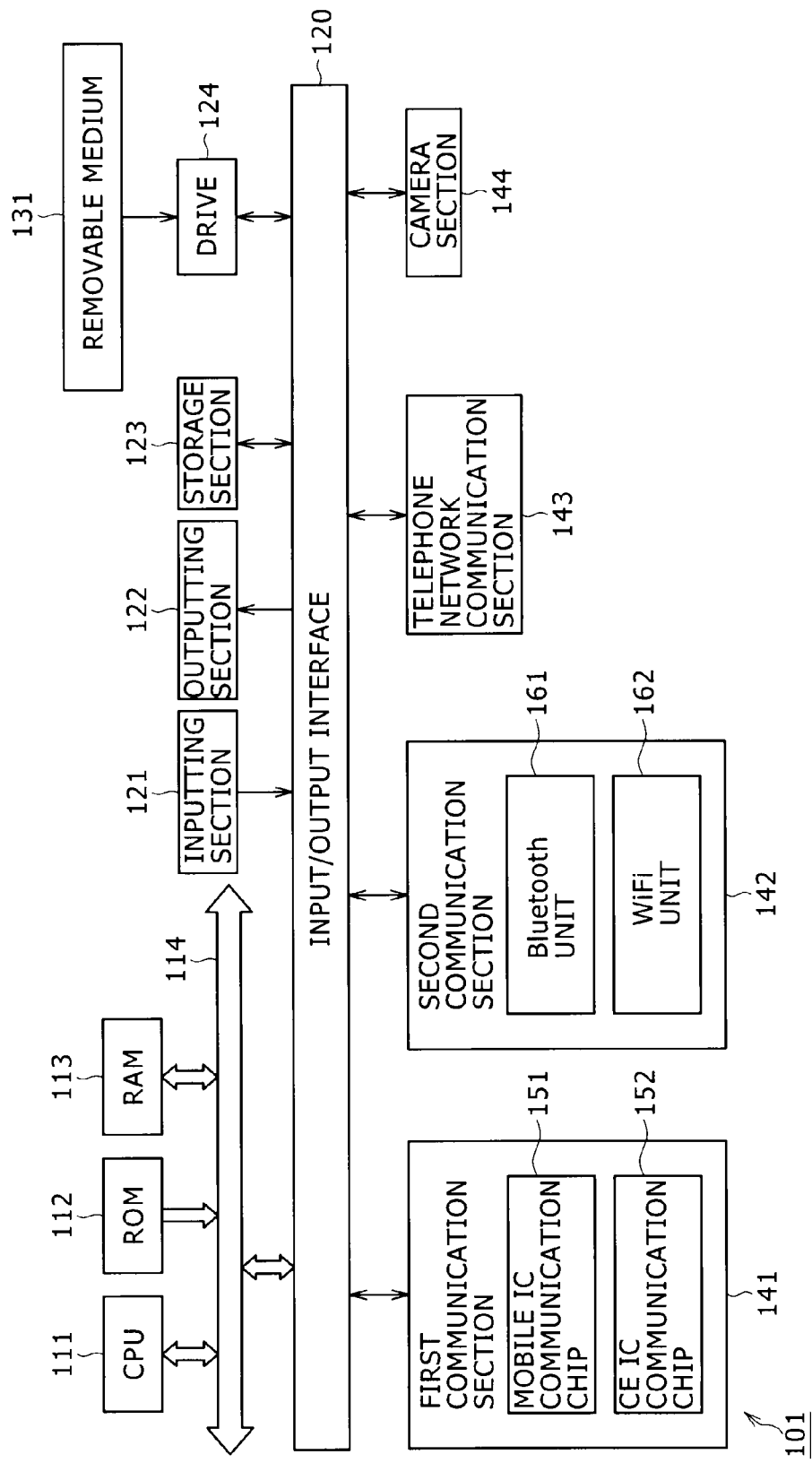

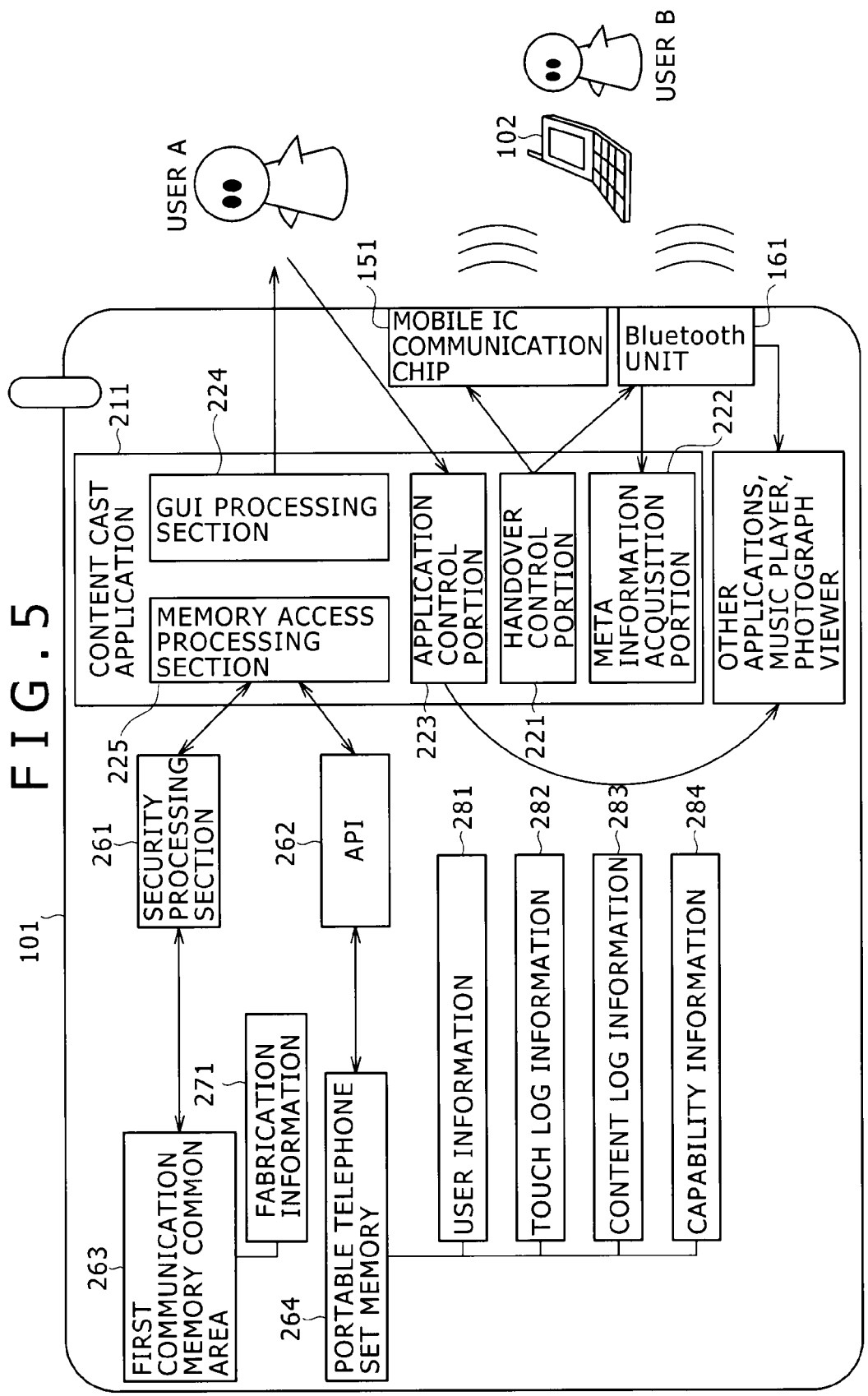

FIG. 6

| DATA ITEM | SUBSTANCE | SIGNIFICANCE |
|---|---|---|
| APPARATUS INFORMATION | APPARATUS TYPE | PORTABLE TELEPHONE SET, VEHICLE-CARRIED AUDIO SYSTEM, (IN THE CASE OF BT, BT SETTING INFORMATION IS USED) |
| CAPABILITY INFORMATION | PHY | WiFi/Bluetooth (INCLUDING PRIORITY LEVEL SETTING) |
| | PROTOCOL | DLNA/Bluetooth |
| | PROFILE | DLNA: MUSIC, PHOTOGRAPH, MOVING PICTURE<br>Bluetooth: A2DP, AVRCP, BIP, ....<br>(INCLUDING VERSION, TRANSMISSION/RECEPTION ROLE) |
| | BEHAVIOR SETTING BY PROFILE | AFTER CONNECTION, IT IS SPECIFIED WHAT BEHAVIOR IS APPLIED TO EACH OF LOCAL/REMOTE |
| | LOCAL CONNECTION APPARATUS INFORMATION | FOR EACH PROFILE, INFORMATION OF HEADSET LOCALLY CONNECTED ALREADY AND SO FORTH → IN ORDER TO DETERMINE DESTINATION FROM OPPOSITE PARTY |
| | APPARATUS STATE | POWER SUPPLY STATE AT PRESENT, COMMUNICATION CONNECTION STATE WITH THIRD PARTY |
| | APPLICATION INFORMATION | NAME AND VERSION OF APPLICATION, CHARACTER CODE USED FOR COMMUNICATION |
| SERVICE COOPERATION INFORMATION | SERVICE ID | ID FOR SPECIFYING CONTENT COOPERATION DESTINATION SUCH AS AFFILIATE, SEARCH SITE, SHOP OR COMMUNITY OR SITE OF INVITATION OR BUDDY REGISTRATION |
| | SERVICE TYPE | FLAG FOR SPECIFYING TYPE OF META INFORMATION SUCH AS PROFILE OR MUSIC CONTENTS OF OBJECT OF ADDITION FOR EACH SITE |
| | SITE URL | LINK URL TO ABOVE SERVICE |
| | SERVICE OPTION ID | SET TOUCHING USER, COUPON NO., ETC., UPON ACCESSING TO ABOVE SERVICE |
| | POSITION INFORMATION | TOUCHED PLACE |

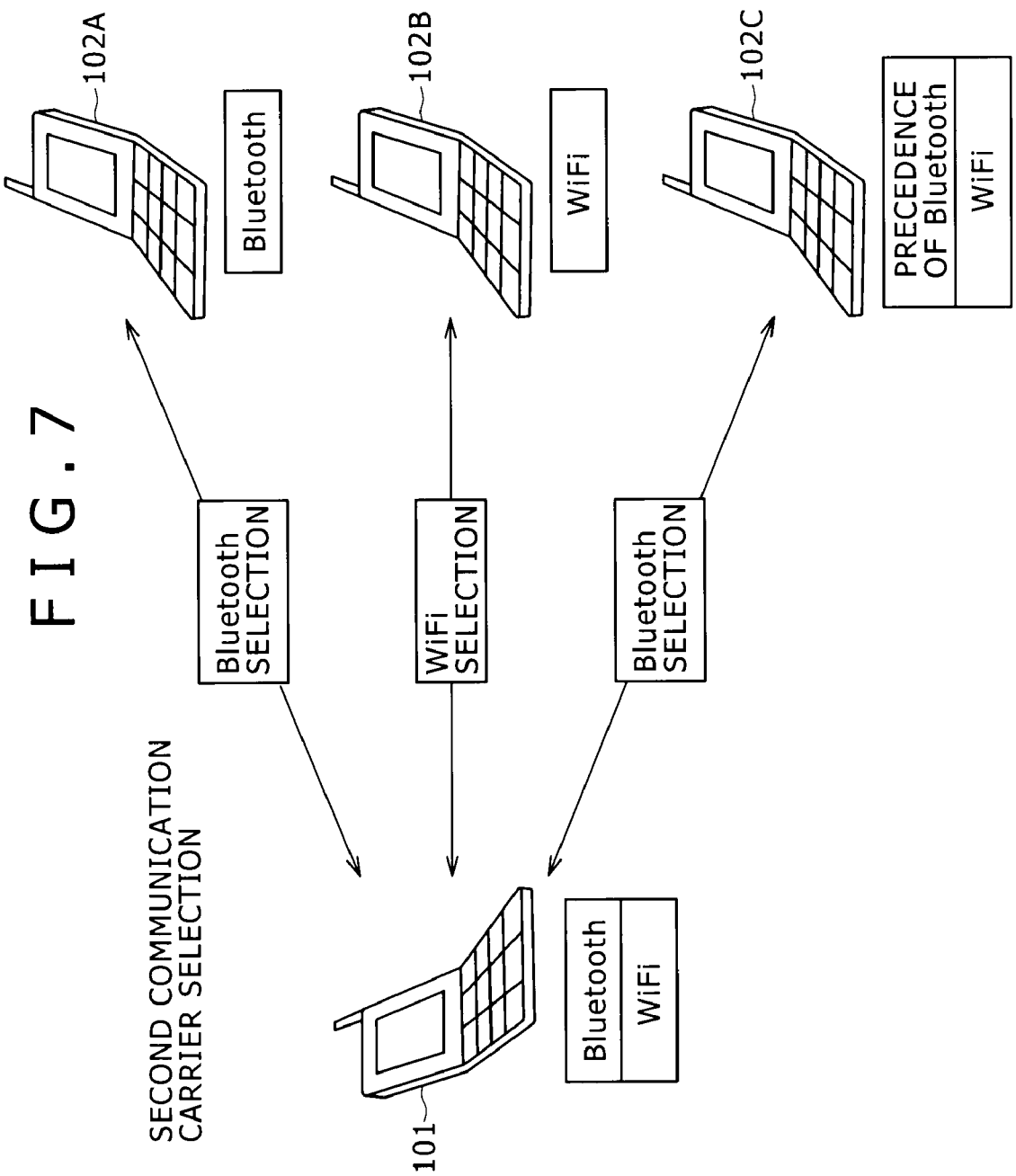

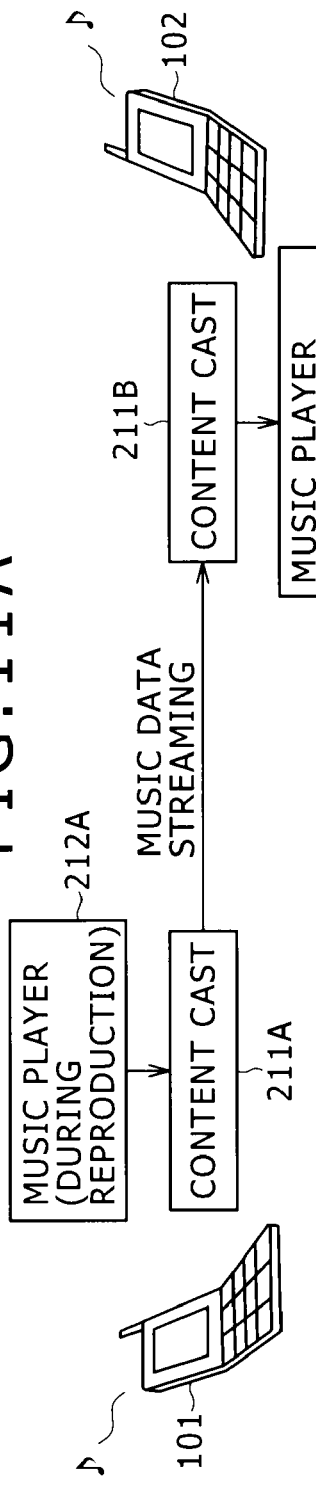
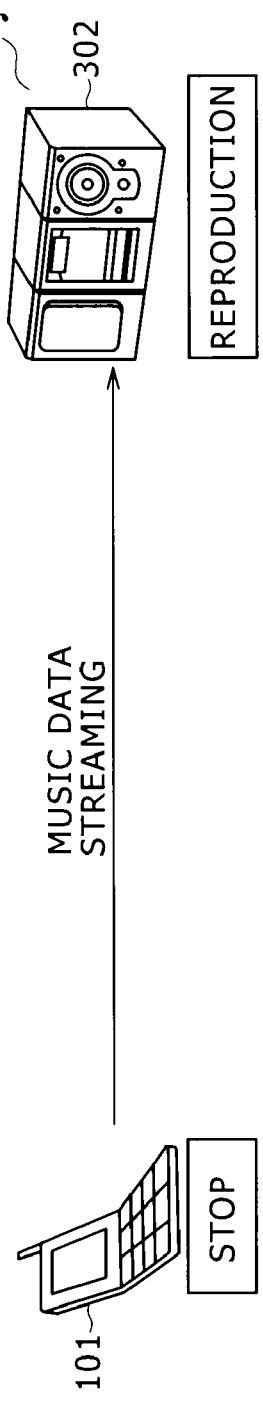

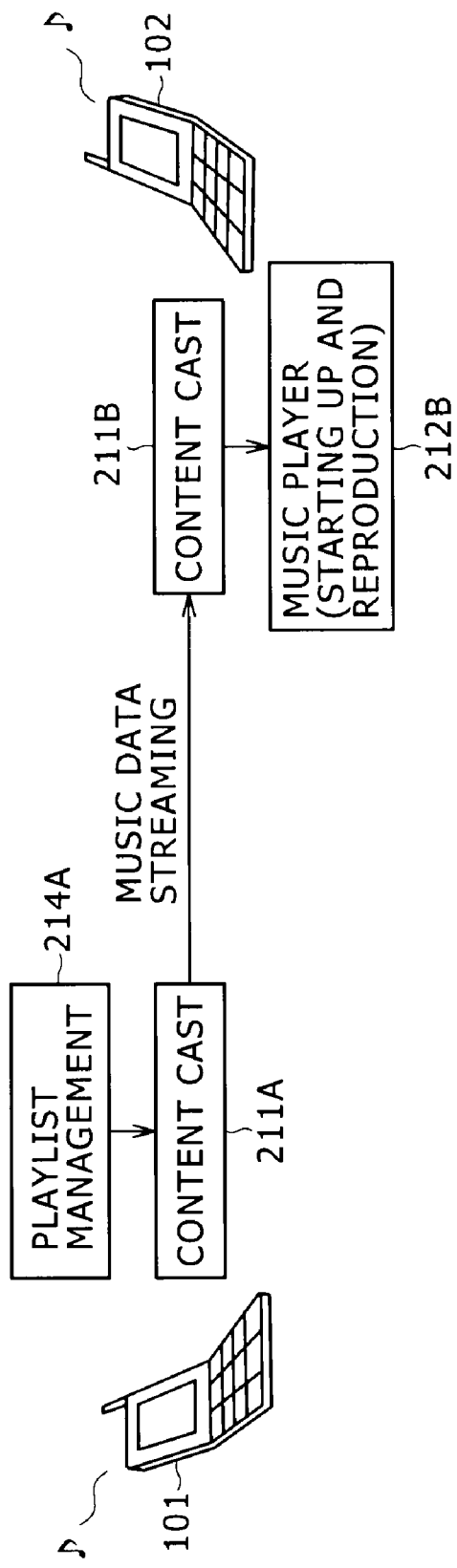

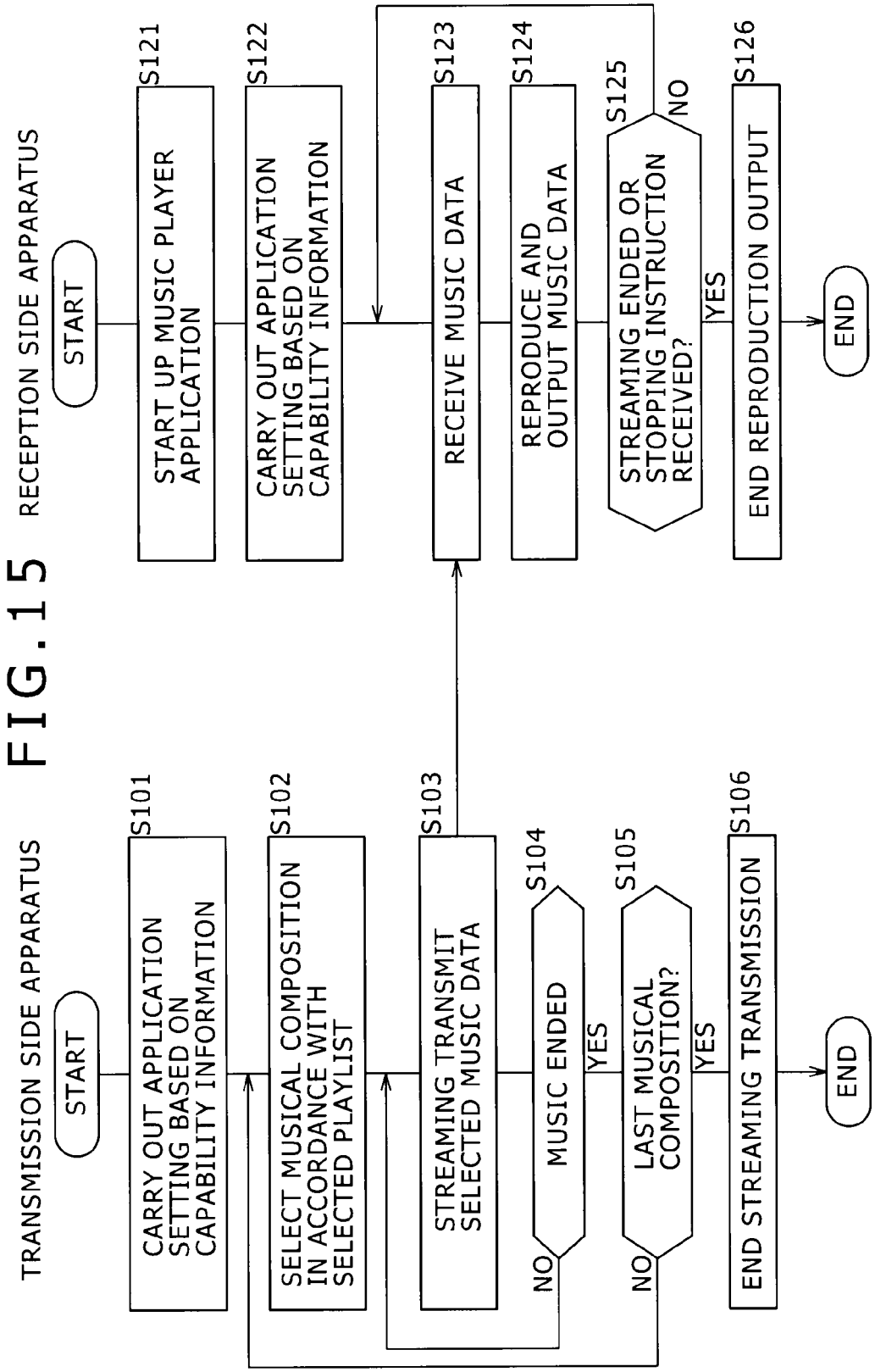

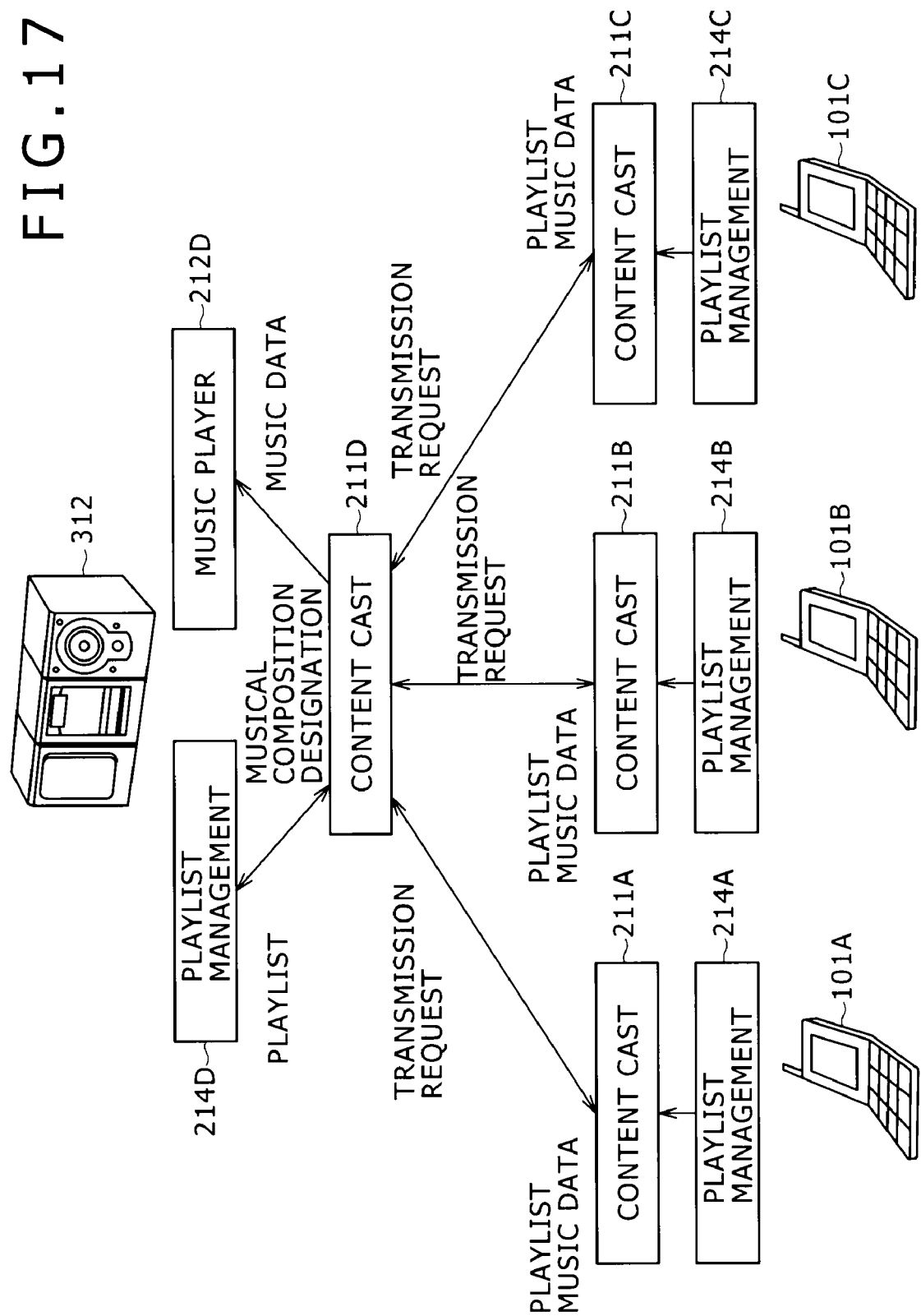

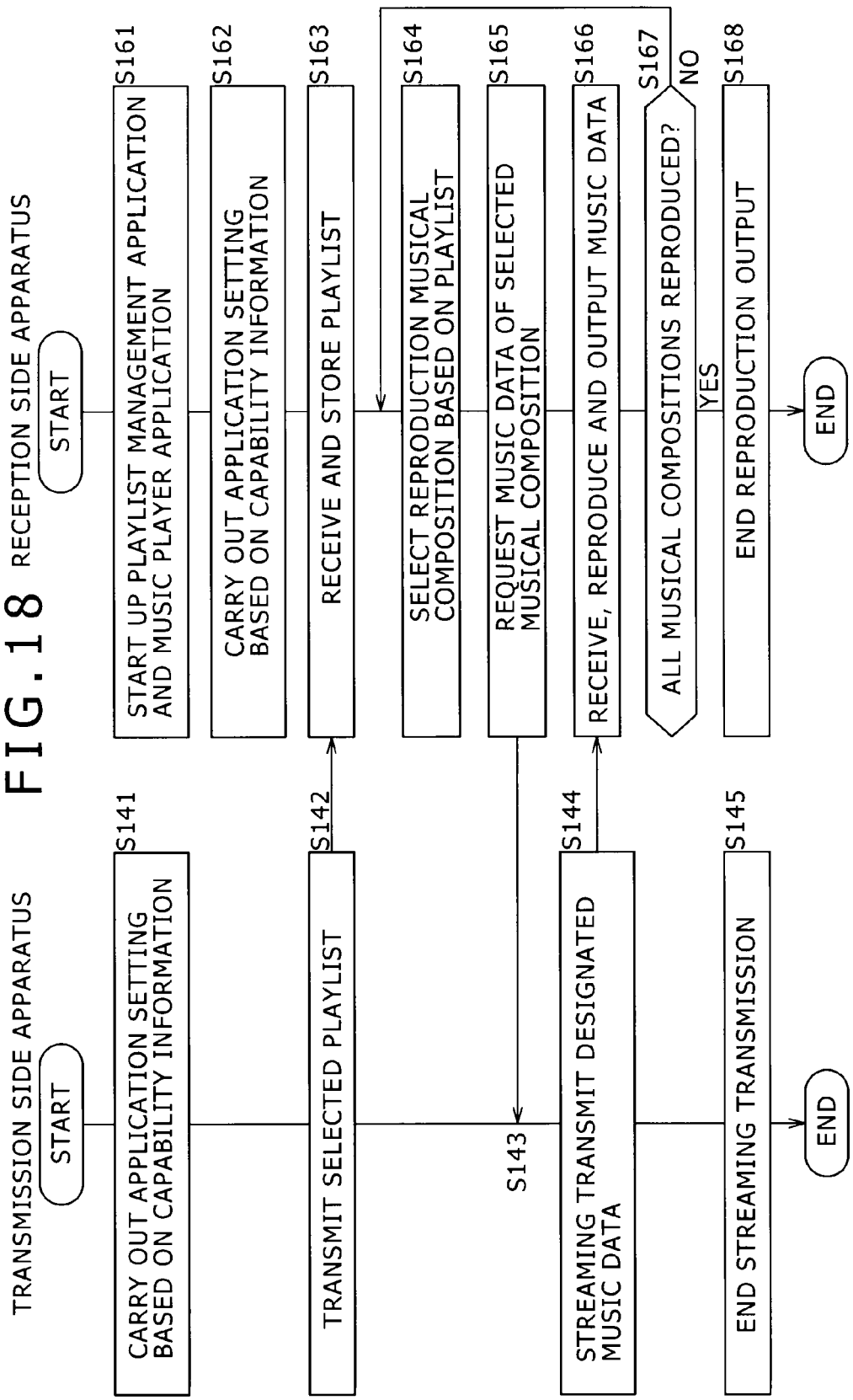

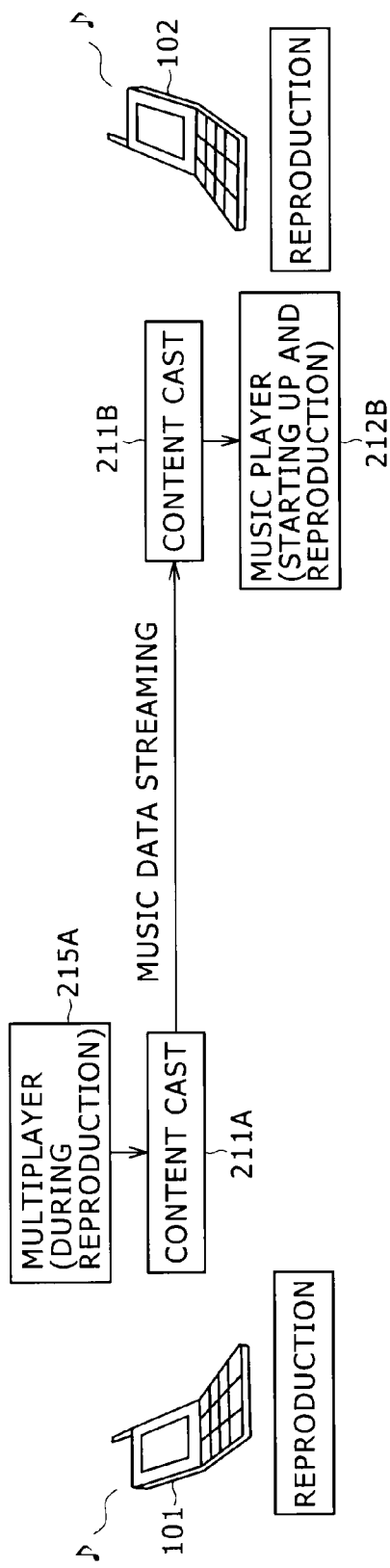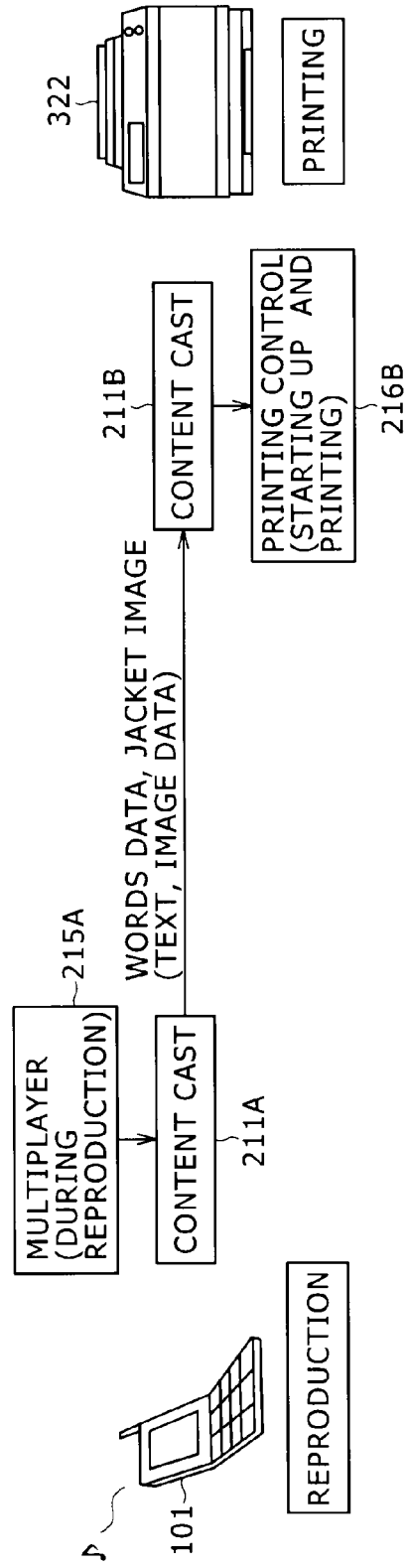

FIG.20

TRANSMISSION SIDE APPARATUS

START → S181 CARRY OUT APPLICATION SETTING BASED ON CAPABILITY INFORMATION → S182 SEND TEXT DATA AND IMAGE DATA → END

RECEPTION SIDE PRINTER

START → S191 START UP PRINTING CONTROL APPLICATION → S192 CARRY OUT APPLICATION SETTING BASED ON CAPABILITY INFORMATION → S193 RECEIVE TEXT DATA AND IMAGE DATA → S194 PRINT TEXT DATA AND IMAGE DATA → END

INFORMATION PROCESSING APPARATUS AND METHOD AND PROGRAM

CROSS REFERENCES TO RELATED APPLICATIONS

The present invention contains subject matter related to Japanese Patent Application JP 2008-049739, filed in the Japan Patent Office on Feb. 29, 2008, the entire contents of which being incorporated herein by reference.

BACKGROUND OF THE INVENTION

1. Field of the Invention

This invention relates to an information processing apparatus and method and a program, and more particularly to an information processing apparatus and method and a program which involve communication between different apparatus.

2. Description of the Related Art

Traditionally, applications are available which cause an apparatus to communicate with a different apparatus in accordance with a predetermined communication system to operate in cooperation with the different apparatus to provide a service such as, for example, sharing of information. An application of the type described is disclosed, for example, in Japanese Patent Laid-open No. 2006-285716 (hereinafter referred to as Patent Document 1).

According to the application disclosed in Patent Document 1, when one user 12β creates a topic under a given title on an electronic bulletin board 33, a bulletin board server 31 allows different users 12B and 12C to write into the topic. When the different user 12B writes information of contents to be recommended along the title into the topic, the bulletin board server 31 outputs a list indicative of the recommended contents as a playlist to terminals 11A to 11D of the users 12A to 12D who have accessed the bulletin board server 31 through a network 20. When one of the contents included in the playlist is designated, a content server 32 outputs the designated content to the terminal of the user to whom the playlist was outputted.

SUMMARY OF THE INVENTION

However, in order for a certain apparatus to communicate with a different apparatus, it is necessary to exchange information regarding a communication function, an application and so forth between them and establish a connection between them based on the information. Such communication setting operation not only is cumbersome but sometimes requires specific knowledge, and if it is tried to carry out the operation through manual operation of a user, then there is the possibility that easy utilization of the application which involves such communication may be disabled. Particularly where such communication is carried out with a plurality of different apparatus, such setting must be carried out for the individual communication opposite parties, and there is the possibility that the convenience of the application may be further deteriorated.

Therefore, a method is investigated wherein, for example, contactless nearby wireless communication instrument such as an IC card is used such that communication setting information to be used in an application is exchanged with the opposite party of communication to automate the setting. However, in order to appropriately set various conditions, it is sometimes necessary for a user to carry out setting manually.

For example, in recent years, an apparatus which can communicate using a plurality of communication methods or carriers such as the Bluetooth (registered trademark) system and the WiFi (Wireless Fidelity) qualified IEEE (Institute of Electrical and Electronic Engineers) 802.11x system has been popularized. However, where an apparatus of the type is used, the user must select a communication system or carrier to be used based on various conditions such as functions of the opposite party of communication. In this instance, not only there is the possibility that the operation may be complicated, but also there is the possibility that professional knowledge is required in order to carry out appropriate setting. As a result, there is the possibility that the convenience of the application may be deteriorated.

It may seem a possible idea to configure an apparatus such that it can execute a plurality of different applications like an apparatus which shares image data with a different apparatus and another application which shares music data. However, in such an apparatus as just described, it is necessary for the user to select an application, and this makes the operation complicated. As a result, there is the possibility that the convenience of the application is deteriorated. Further, there is the possibility that professional knowledge may be required in order to appropriately select an application to be executed in that an application which can be executed is restricted depending upon various conditions such as the performance of the opposite party of communication and so forth.

Therefore, it is desirable to provide an information processing apparatus and method and a program which can improve the convenience of an application which involves communication with a different apparatus.

According to an embodiment of the present invention, there is provided an information processing apparatus for communicating with a different information processing apparatus, including a first connection establishment block configured to control a first communication section, which carries out nearby wireless communication for delivering and accepting information to and from the different information processing apparatus positioned near to the information processing apparatus, to establish a connection for the nearby wireless communication; an acquisition block configured to acquire setting information for short range wireless communication which exhibits a wire communication range than the nearby wireless communication and capability information regarding the capacity of the different information processing apparatus from the different information processing apparatus through the nearby wireless communication for which the connection is established by the first connection establishment block; and a second connection establishment block configured to control a second communication section, which carries out the short range wireless communication, based on the setting information and the capability information acquired by the acquisition block to establish a connection for the short range wireless communication.

The information processing apparatus may be configured such that the capability information includes information representative of a communication system of the short range wireless communication by a second communication section of the different information processing apparatus, and the second connection establishment block establishes the short range wireless communication in accordance with a communication system, which can be used for communication by the different information processing apparatus, based on the capability information.

Preferably, the information processing apparatus further includes an application setting block configured to carry out setting of an application which executes a predetermined process based on the information delivered and accepted through the short range wireless communication for which the connection is established by the second connection establishment block, the capability information including information regarding an application which can be executed by the different information processing apparatus, the application setting block carrying out, based on information indicated by the capability information and regarding an application which can be executed by the different information processing apparatus, the setting of the application.

The information processing apparatus may be configured such that the information processing apparatus carries out communication with a plurality of different information processing apparatus, and the capability information includes information indicative, for each of the plurality of the different information processing apparatus, of a communication system for the short range wireless communication by the second communication section of the different information processing apparatus, the second connection establishment block being operable to select, based on the capability information, an opposite party of communication for the short range wireless communication from among the plurality of the different information processing apparatus and establish the short range wireless communication with the selected different information processing apparatus in accordance with a communication system with which the selected different information processing apparatus can use for communication.

Preferably, the information processing apparatus further includes an application setting block configured to carry out setting of an application which executes a predetermined process based on the information delivered and accepted through the short range wireless communication for which the connection is established by the second connection establishment block, the information processing apparatus carrying out communication with a plurality of different information processing apparatus, the capability information including information indicative, for each of the plurality of the different information processing apparatus, of applications which can be executed by the different information processing apparatus, the second connection establishment block being operable to select an opposite party of communication for the short range wireless communication from among the plurality of the different information processing apparatus based on the capability information to establish the short range wireless communication, the application setting block carrying out, based on information indicated by the capability information and regarding the applications which can be executed by the different information processing apparatus selected by the second connection establishment block, the setting of the application.

According to another embodiment of the present invention, there is provided an information processing method for an information processing apparatus for communicating with a different information processing apparatus, including the steps of controlling a first communication section, which carries out nearby wireless communication for delivering and accepting information to and from the different information processing apparatus positioned near to the information processing apparatus, to establish a connection for the nearby wireless communication, acquiring setting information for short range wireless communication which exhibits a wider communication range than the nearby wireless communication and capability information regarding the capacity of the different information processing apparatus from the different information processing apparatus through the nearby wireless communication for which the connection is established, and controlling a second communication section, which carries out the short range wireless communication, based on the acquired setting information and capability information, to establish a connection for the short range wireless communication.

According to a further embodiment of the present invention, there is provided a program for causing a computer to cause an information processing apparatus to communicate with a different information processing apparatus, the program including a first connection establishment step of controlling a first communication section, which carries out nearby wireless communication for delivering and accepting information to and from the different information processing apparatus positioned near to the computer, to establish a connection for the nearby wireless communication, an acquisition step of acquiring setting information for short range wireless communication which exhibits a wider communication range than the nearby wireless communication and capability information regarding the capacity of the different information processing apparatus from the different information processing apparatus through the nearby wireless communication for which the connection is established, and a second connection establishment step of controlling a second communication section, which carries out the short range wireless communication, based on the acquired setting information and capability information, to establish a connection for the short range wireless communication.

In the information processing apparatus, information processing method and program, the first communication section which carries out the nearby wireless communication for delivering and accepting information to and from the different information processing apparatus positioned near to the information processing apparatus is controlled to establish a connection for the nearby wireless communication. Then, the setting information for the short range wireless communication which exhibits a wider communication range than the nearby wireless communication and the capability information regarding the capacity of the different information processing apparatus are acquired from the different information processing apparatus through the nearby wireless communication for which the connection is established. Then, the second communication section which carries out the short range wireless communication is controlled based on the acquired setting information and capability information to establish a connection for the short range wireless communication.

According to a still further embodiment of the present invention, there is provided an information processing apparatus for communicating with a different information processing apparatus, including a connection establishment block configured to control a communication section, which carries out nearby wireless communication for delivering and accepting information to and from the different information processing apparatus positioned near to the information processing apparatus, to establish a connection for the nearby wireless communication; an acquisition block configured to acquire capability information regarding the capacity of the different information processing apparatus from the different information processing apparatus through the nearby wireless communication; and an application setting block configured to carry out setting of an application for executing a predetermined process based on the information delivered and accepted to and from the different information processing apparatus based on the capability information acquired by the acquisition block.

Preferably, the information processing apparatus further includes a transmission block configured to transmit the capability information regarding the capacity of the information processing apparatus to the different information processing apparatus through the nearby wireless communication.

In the information processing apparatus, the communication section which carries out the nearby wireless communication for delivering and accepting information to and from the different information processing apparatus positioned near to the information processing apparatus is controlled to establish a connection for the nearby wireless communication. Then, the capability information regarding the capacity of the different information processing apparatus is acquired from the different information processing apparatus through the nearby wireless communication. Then, setting of an application for executing a predetermined process based on the information delivered and accepted to and from the different information processing apparatus is carried out based on the acquired capability information.

The network is a mechanism which includes at least two apparatus connected to each other such that information can be transmitted from one to another one of the apparatus. The apparatus which communicate with each other through the network may be independent apparatus of each other or internal blocks which compose one apparatus.

The communication may assume any form such as wireless communication, wire communication, or communication which includes both of wireless communication and wire communication such as communication wherein wireless communication is used within a certain section and wire communication is used within another section. Further, the communication may assume a different form wherein wire communication is used for communication from a certain apparatus to a different apparatus and wireless communication is used for communication from the different apparatus to the certain apparatus.

With the information processing apparatus, information processing method and program, information processing can be carried out. Particularly, the convenience of an application which involves communication between apparatus can be improved.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a block diagram showing an example of principal configuration of a portable telephone set shown in FIG. 1;

FIG. 5 is a block diagram illustrating an example of a manner of operation of the handover application illustrated in FIG. 4;

FIG. 6 is a view illustrating an example of a configuration of various kinds of information handled in the communication system of FIG. 1;

FIG. 7 is a diagrammatic view illustrating an example of setting and control of second communication used in the communication system of FIG. 1;

FIGS. 11A, 11B and 11C are schematic views illustrating a first example of application control by the portable telephone set shown in FIG. 1;

FIG. 14 is a block diagram illustrating a second example of application control by the portable telephone set shown in FIG. 1;

FIG. 15 is a flow chart illustrating an example of a flow of the control process for the application control of FIG. 14;

FIG. 17 is a block diagram illustrating a third example of application control by the portable telephone set shown in FIG. 1;

FIG. 18 is a flow chart illustrating an example of a flow of the control process for the application control of FIG. 17;

FIGS. 19A and 19B are block diagrams illustrating a fourth example of application control by the portable telephone set shown in FIG. 1;

FIG. 20 is a flow chart illustrating an example of a flow of the control process for the application control of FIGS. 19A and 19B;

DETAILED DESCRIPTION OF THE PREFERRED EMBODIMENT

Figure 1:
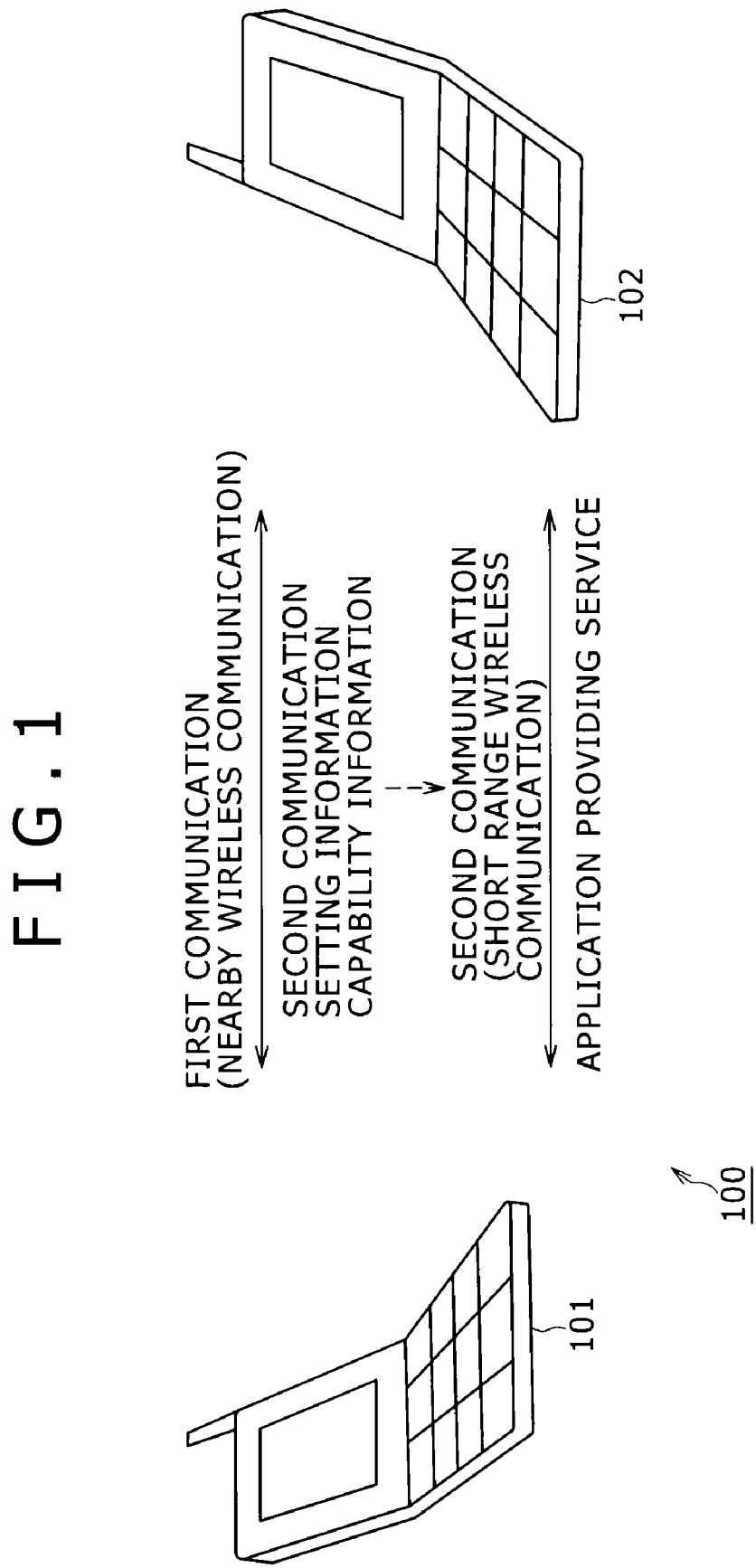
FIG. 1 is a block diagram showing an example of principal configuration of a communication system to which the present invention is applied.

Referring first to FIG. 1, there is shown an example of a configuration of a communication system to which the present invention is applied. In the communication system 100 shown, a plurality of apparatus cooperate with each other through wireless communication to execute an application for providing a series of services. As shown in FIG. 1, the communication system 100 includes, for example, a portable telephone set 101 and another portable telephone set 102.

The portable telephone set 101 and the portable telephone set 102 carry out communication with each other using two methods of first communication and second communication. The first communication is nearby wireless communication carried out to deliver and accept setting information for the second communication, that is, second communication setting information, capability information regarding the capacity of an apparatus and other information. The second communication is short range wireless communication for allowing applications executed on the portable telephone set 101 and the portable telephone set 102 to operate in cooperation with each other to carry out communication necessary to provide a series of services, that is, application providing services.

It is to be noted that the nearby wireless communication here is a wireless communication system wherein housings of the portable telephone set 101 and the portable telephone set 102 are placed in contact with each other or in a state wherein they are positioned close to each other at a distance of approximately several centimeters. As one of such nearby wiring communication systems, a wireless communication system is available which makes use of electromagnetic induction, for example, as in a contactless IC (Integrated Circuit) card. Meanwhile, the short range wireless communication is a wireless communication system which allows communication between the portable telephone set 101 and the portable telephone set 102 in a state wherein the housings of them are positioned at a short distance of approximately several tens meter or less. For example, the Bluetooth (registered trademark) system and the WiFi (Wireless Fidelity) system (WiFi-qualified IEEE (Institute of Electrical and Electronic Engineers) 802.11x) are available for the short range wireless communication.

Generally, in the case of the nearby wireless communication used as the first communication, it is easy to specify the opposite party of communication from a physical limitation of the communication range of the same, and the setting operation for establishing a communication connection is easier as much than that in the case of the short range wireless communication. For example, in the case of the short range wireless communication, if a plurality of devices exist within a communication range within which communication is possible, then it is necessary for the user to designate with which one of devices communication should be carried out. However, in the case of the nearby wireless communication, the user must move the device operated by the user itself so as to be positioned in the proximity of a device which should become the opposite party of communication, and the number of opposite parties of communication is basically limited to one. Therefore, there is no necessity to input a designation of the opposite party of communication or the like.

However, the nearby wireless communication is not suitable for data transfer of a large amount because generally the data transfer rate is lower than that of the short range wireless communication. Further, although the devices must be kept closely to each other during communication, it may sometimes be difficult to keep the posture of the devices, that is, the positional relationship of the devices. Also communication among three or more devices is difficult.

From the foregoing, in the communication system 100, cooperation of applications or of the portable telephone set 101 and the portable telephone set 102, is carried out using the second communication, that is, using the short range wireless communication whereas the first communication, that is, the nearby wireless communication, is utilized for delivery and acceptance of second communication setting information for the second communication and capability information. In particular, the portable telephone set 101 and the portable telephone set 102 first exchange individual second communication setting information by the first communication and then establish a connection for the second communication based on the second communication setting information, where after they carry out a cooperation operation of applications utilizing the second communication.

At this time, the portable telephone set 101 and the portable telephone set 102 exchange not only the second communication setting information but also individual capability information in the first communication. Then, the portable telephone set 101 and the portable telephone set 102 carry out detailed setting of a communication section or communication system to be used in the second communication based on the capability information of the individual opposite party of communication or select an application to be used. Through the exchange of such capability information, the portable telephone set 101 and the portable telephone set 102 can carry out communication and setting of an application appropriately without inadvertently increasing the operation amount of the user, and the convenience of the application which involves communication between devices can be improved.

It is to be noted that each of the communication apparatus which compose the communication system 100 may be any communication apparatus only if it can carry out the first communication and the second communication and may be other apparatus than the portable telephone set 101 and the portable telephone set 102. For example, they may be a television signal receiver, a video recorder, a medium player, an audio amplifier, an audio compo, a printer, a facsimile apparatus, a vehicle-carried audio system, a car navigation system or the like. Naturally, some other apparatus may be used. Or, the communication apparatus which compose the communication system 100 may have different functions from each other, for example, like a portable telephone set and an audio compo.

Further, the number of communication apparatus which compose the communication system 100 is optional and may be three or more.

In the following description, it is assumed for the convenience of description that the communication system 100 is basically composed of the portable telephone set 101 and the portable telephone set 102 as seen in FIG. 1. However, description is given suitably in regard to some different or modified configuration.

FIG. 2 shows an example of an internal configuration of the portable telephone set 101.

Referring to FIG. 2, the portable telephone set 101 includes a (Central Processing Unit) CPU 111 serving as a mathematical operation processing section which executes a software program to execute various processes. The CPU 111 is connected to a ROM (Read Only Memory) 112 and a RAM (Random Access Memory) 113 through a bus 114. The ROM 112 has software programs and data stored therein in advance. Into the RAM 113, the software programs and data stored in the ROM 112 and a storage section 123 are loaded. Also data and so forth necessary for the CPU 111 to execute various processes are stored suitably into the RAM 113.

The CPU 111, ROM 112 and RAM 113 are connected to each other by the bus 114. Also an input/output interface 120 is connected to the bus 114.

To the input/output interface 120, an inputting section 121 including a keyboard, a mouse and so forth, an outputting section 122 including a display such as a CRT (Cathode Ray Tube) display or an LCD (Liquid Crystal Display), a speaker and so forth, and a storage section 123 formed from a hard disk and so forth are connected.

A drive 124 is connected to the input/output interface 120 as occasion demands. A removable medium such as a magnetic disk, an optical disk, a magneto-optical disk or a semiconductor memory is suitably loaded into the drive 124, and a computer program read out from the removable medium 131 is installed into the storage section 123 as occasion demands.

Further, a first communication section 141 which carries out the first communication, a second communication section 142 which carries out the second communication, a telephone network communication section 143 formed from a modem and so forth to carry out speech communication or packet communication with a different apparatus through a public telephone network, and a camera section 144 having a digital camera function of picking up an image of an image pickup object to obtain image data are connected to the input/output interface 120.

The first communication section 141 is a wireless communication section which carries out nearby wireless communication as described hereinabove. The first communication section 141 includes an IC communication chip 151 for a mobile apparatus (hereinafter referred to as mobile IC communication chip 151) which is a wireless communication section which carried out communication in accordance with a communication system used in a contactless IC card and an IC communication chip 152 for a digital appliance (hereinafter referred to as CE (Consumer Electronics) IC communication chip 152). The first communication section 141 selectively uses one of the mobile IC communication chip 151 and the CE IC communication chip 152. The mobile IC communication chip 151 and the CE IC communication chip 152 carry out communication based on communication standards different from each other.

The second communication section 142 is a wireless communication section which carries out short range wireless communication as described hereinabove. The second communication section 142 includes a Bluetooth (registered trademark) unit 161 which is a wireless communication section which carries out wireless communication in accordance with the Bluetooth system. The second communication section 142 further includes a WiFi unit 162 which is a WiFi-authorized wireless communication section which carries out wireless communication in accordance with the IEEE 802.11x system. The second communication section 142 selectively uses one of the Bluetooth unit 161 and the WiFi unit 162.

It is to be noted that, while it is described that, in FIG. 2, each of the first communication section 141 and the second communication section 142 includes two different communication sections, the number of communications included in each of the first communication section 141 and the second communication section 142 may be any number. Further, the first communication section 141 may be any communication section only if it carries out nearby wireless communication while the second communication section 142 may be any communication system only if it carries out short range wireless communication. Further, a communication section which carries out communication using a communication system other than those described above may be provided.

Naturally, the portable telephone set 101 may have a configuration different from that described above. Further, some of the functions such as the camera section 144 can be omitted.

Also the portable telephone set 102 which is the opposite party of communication of the portable telephone set 101 has a basically similar configuration to that of the portable telephone set 101 described above with reference to FIG. 2, and therefore, description of the configuration of the portable telephone set 102 is omitted. In particular, the description given hereinabove with reference to FIG. 2 can be applied also to the portable telephone set 102, and description of the portable telephone set 102 is given with reference to FIG. 2 similarly to the portable telephone set 101. It is to be noted that this similarly applies also to configurations hereinafter described with reference to FIGS. 3 and 4. In other words, in the following description, it is described that the party which issues a request for a handover process is the portable telephone set 101 and the party which responds to the request is the portable telephone set 102. However, also another case is possible wherein the same apparatus may serve as the requesting side or as the responding side in accordance with the situation, and there is no necessity for the requesting side apparatus and the responding side apparatus to have different configurations from each other. Also in the following description, it is described that the configurations of the portable telephone set 101 and the portable telephone set 102 are basically same as each other. In other words, the following description of the configuration of the portable telephone set 101 is applied also to the description of the portable telephone set 102.

Figure 3:
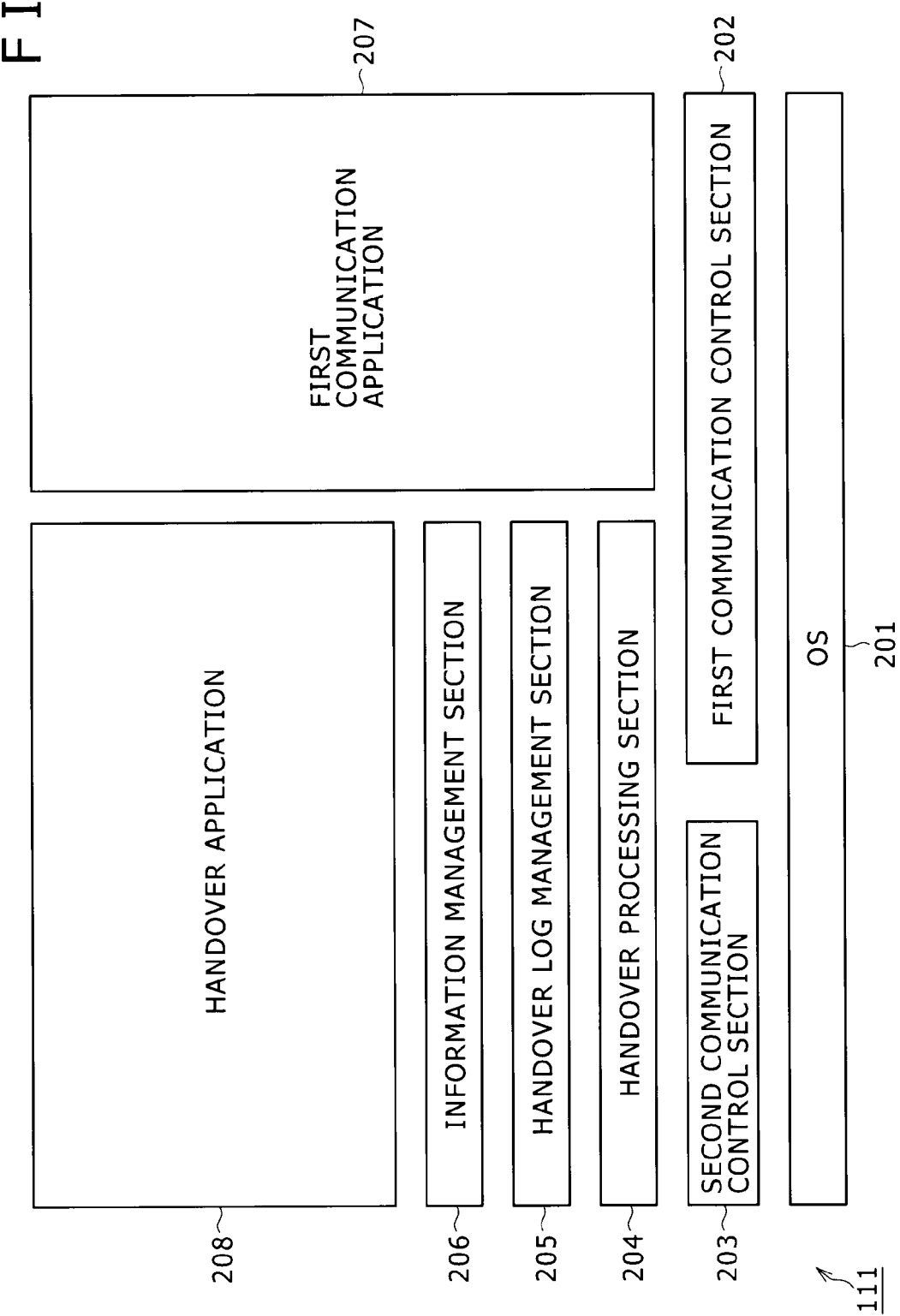
FIG. 3 is a functional block diagram illustrating an example of functions which can be implemented by a CPU shown in FIG. 2.

FIG. 3 shows functions which the CPU 111 shown in FIG. 2 which executes an application has. Referring to FIG. 3, the CPU 111 implements various functions by reading in various data and executing a program. FIG. 3 schematically illustrates the functions implemented in this manner.

The CPU 111 includes an operating system (OS) 201, a first communication control section 202, a second communication control section 203, a handover processing section 204, a handover log management section 205, an information management section 206, a first communication application 207 and a handover application 208.

The OS 201 is basic software which provides basic functions to be utilized commonly from many pieces of application software and manages the entire computer system. For example, the OS 201 controls the processing sections other than the OS 201 in accordance with an instruction from another functional block to carry out various control processes such as an inputting and outputting function such as user interface inputting or screen image outputting and management of a disk and a memory. The first communication control section 202 controls the first communication section 141 through the OS 201 to carry out processes relating to the first communication. The second communication control section 203 controls the second communication section 142 through the OS 201 to carry out processes relating to the second communication.

The handover processing section 204 controls, for example, the first communication control section 202 and the second communication control section 203 to deliver and accept setting information for the second communication using the first communication and carries out a process of establishing a connection for the second communication using the accepted information, that is, a handover process. The handover processing section 204 carries out, in such handover process, delivery and acceptance not only of setting information for the second communication using the first communication but also of capability information indicative of a function or an application which the apparatus has. Consequently, the handover processing section 204 can carry out setting for the second communication and execution of an application appropriately based on the capability information.

The handover log management section 205 manages a log of the processing substance of the handover processing section 204. The information management section 206 manages various kinds of information such as capability information and profile information delivered to and accepted from the opposite party of communication.

The first communication application 207 provides a service which uses only the first communication such as electronic money settlement or an authentication process. The handover application 208 provides a service using the second communication and carries out a handover process for establishing the second communication. In other words, the handover application 208 uses both of the first communication and the second communication. A particular example of the handover application is hereinafter described.

It is to be noted that, while the first communication application 207 in FIG. 3 is described as one functional block, the number of applications for the first communication is optional, and the first communication application 207 may include a plurality of different applications. Similarly, also the number of handover applications is optional, and the handover application 208 may include a plurality of different applications.

Figure 4:
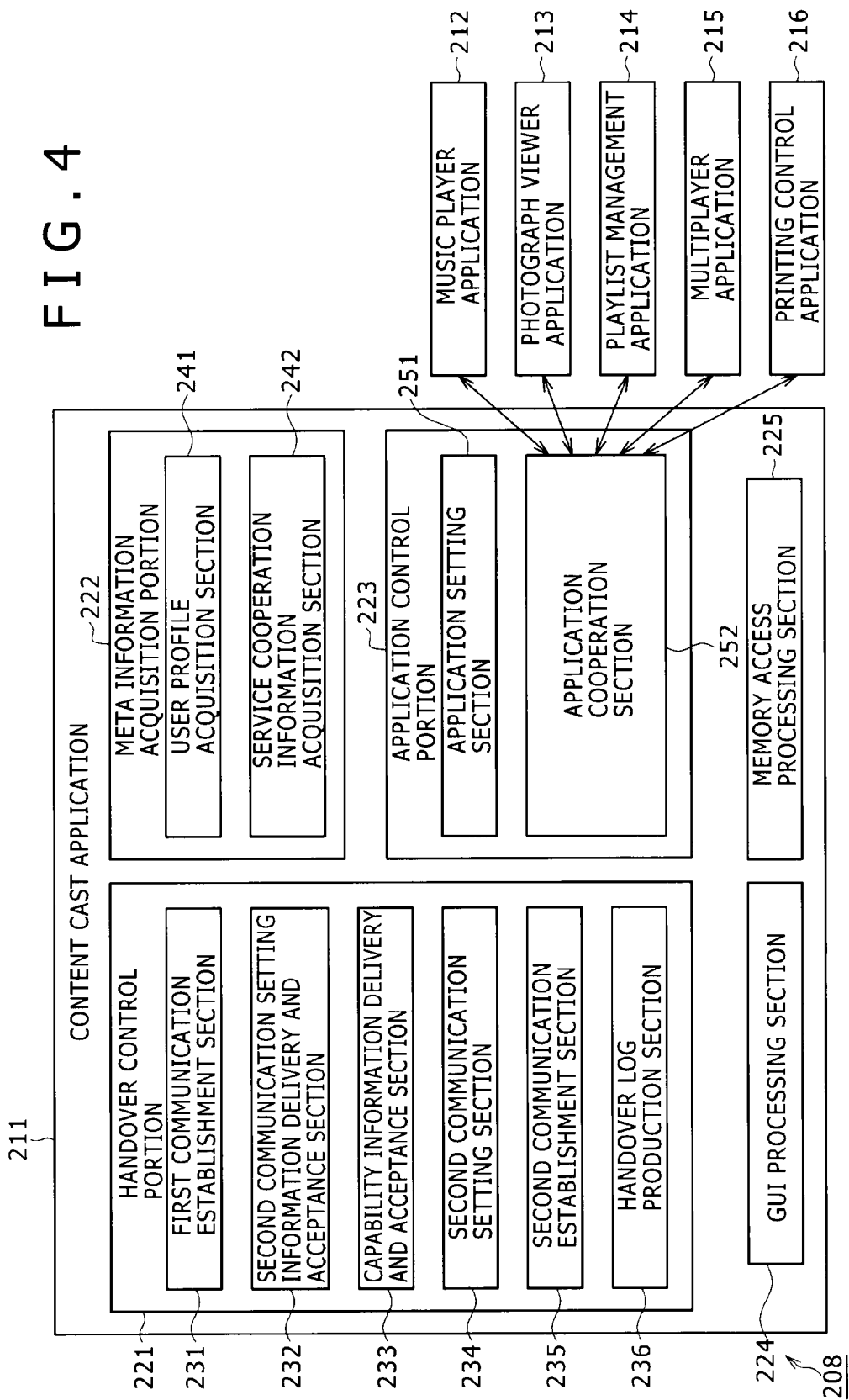
FIG. 4 is a diagrammatic view illustrating an example of a handover application illustrated in FIG. 3.

FIG. 4 schematically shows an example of a configuration of the handover application 208. Referring to FIG. 4, the example of the configuration of the handover application 208 includes a content cast application 211, a music player application 212, a photograph viewer application 213, a playlist management application 214, a multiplayer application 215 and a printing control application 216.

The content cast application 211 uses the second communication to deliver and accept content data of an image, sound or the like to and from a device of the opposite party of communication. The content cast application 211 operates basically in cooperation with a different application such as the applications from the music player application 212 to the printing control application 216 to carry out delivery and acceptance of content data required by the different application.

The music player application 212 reads out and reproduces music data stored, for example, in the storage section 123 and outputs sound from the outputting section 122 such as the speaker. The music player application 212 operates in cooperation with the content cast application 211 to use the second communication to supply music data as streaming data to the apparatus of the opposite party of communication so that the apparatus of the opposite party of communication can reproduce and output the music. Or, the music player application 212 can acquire streaming data of music data supplied from the apparatus of the opposite party of communication and reproduce and output the music.

The photograph viewer application 213 causes the monitor of the outputting section 122 to display image data of a still picture, a moving picture or the like stored, for example, in the storage section 123. The photograph viewer application 213 operates in cooperation with the content cast application 211 to use the second communication to supply image data to the apparatus of the opposite party of communication so that the image can be displayed on the monitor of the apparatus of the opposite party of communication. Or, the photograph viewer application 213 can acquire image data supplied from the apparatus of the opposite party of communication and cause the monitor of the outputting section 122 to display the image.

The playlist management application 214 manages a playlist indicative of a reproduction output order or displaying order of reproduced content data reproduced, outputted and displayed by the music player application 212 or the photograph viewer application 213. Further, the playlist management application 214 displays the playlist on the monitor of the outputting section 122, accepts a user instruction input responsive to the displayed playlist and controls the music player application 212 or the photograph viewer application 213 in accordance with the accepted instruction. Furthermore, the playlist management application 214 can operate in cooperation with the content cast application 211 to use the second communication to control the music player application or the photograph viewer application of the apparatus of the opposite party of communication. For example, the playlist management application 214 can supply music data designated by the user to the apparatus of the opposite party of communication using the content cast application 211 to start up the music player application of the apparatus of the opposite party of communication so that the music can be reproduced and outputted.

The multiplayer application 215 can process a plurality of kinds of content data such as to reproduce and output music data while causing image data corresponding to the music data to be displayed on the monitor. In particular, the multiplayer application 215 has functions basically similar to those of the music player application 212 or the photograph viewer application 213 and can operate in cooperation with the content cast application 211 to use the second communication to deliver and accept content data to and from the apparatus of the opposite party of communication.

The printing control application 216 causes image data, text data and so forth to be printed on a printing medium such as paper by a printing section of the outputting section 122. The printing control application 216 can operate in cooperation with the content cast application 211 to use the second communication to cause the printing section to print content data supplied from the apparatus of the opposite party of communication.

The content cast application 211 includes a handover control portion 221, a meta information acquisition portion 222, an application control portion 223, a GUI (Graphical User Interface) processing section 224 and a memory access processing section 225.

The handover control portion 221 controls the components including the handover processing section 204, handover log management section 205 and information management section 206 to directly or indirectly control the mobile IC communication chip 151 serving as the first communication section or the Bluetooth unit 161 serving as the second communication section to execute processes relating to the handover as seen in FIG. 5, for example. The handover control portion 221 includes a first communication establishment section 231 for carrying out a process relating to establishment of a connection for the first communication, and a second communication setting information delivery and acceptance section 232 for carrying out delivery and acceptance of setting information for the second communication by the first communication. The handover control portion 221 further includes a capability information delivery and acceptance section 233 for exchanging capability information by the first communication, and a second communication setting section 234 for carrying out setting regarding the second communication based on the second communication setting information and the capability information. The handover control portion 221 further includes a second communication establishment section 235 for carrying out processes regarding establishment of a connection for the second communication, and a handover log production section 236 for producing log information regarding a handover process.

The meta information acquisition portion 222 directly or indirectly controls the Bluetooth unit 161 serving as the second communication section, for example, as seen in FIG. 5 to acquire meta information through the second communication whose connection is established. The meta information includes user profile information relating to the user of the opposite party of communication, service cooperation information relating to services provided by the apparatus of the opposite party of communication or a different apparatus which operates in cooperation with the apparatus of the opposite party of communication, and so forth. The meta information acquisition portion 222 includes a user profile acquisition section 241 for acquiring user profile information from the apparatus of the opposite party of communication and a service cooperation information acquisition section 242 for acquiring service cooperation information from the apparatus of the opposite party of communication.

The application control portion 223 carries out, for example, a process relating to a particular application which operates in cooperation with such a content cast application as any of the applications from the music player application 212 to the printing control application 216 as seen in FIG. 5. The application control portion 223 includes an application setting section 251 which carries out setting of a different application based on capability information of the apparatus of the opposite party of communication and like information and an application cooperation section 252 which starts up or controls the different application.

The GUI processing section 224 carries out, for example, a process for displaying a GUI by a content cast application or a process responsive to a user instruction inputted based on the GUI or the like as seen in FIG. 5. The memory access processing section 225 carries out inputting and outputting of information to and from a storage region of the portable telephone set 101. For example, the CPU 111 has, for example, a security processing section 261 which carries out a process such as encryption or decryption of information stored in a memory or storage area built in the first communication section 141 as seen in FIG. 5. The CPU 111 further has an application program interface (API) 262 to a memory or storage area of the portable telephone set 101 other than the first communication section 141 such as the ROM 112 or the storage section 123. The security processing section 261 carries out accessing to a first communication section memory common region 263 formed in the storage area of the memory built in the first communication section 141. The application program interface 262 carries out accessing to a portable telephone set memory 264 formed in the storage area of the memory of the portable telephone set 101 other than the first communication section 141.

In the first communication section memory common region 263, fabrication information 271 including a product number, a model name, a production date and hour and so forth of an apparatus which becomes the opposite party of communication or the portable telephone set 101 itself is stored. In the portable telephone set memory 264, user information 281 indicative of information, for example, relating to the user of the portable telephone set 101 itself or of the apparatus which becomes the opposite party of communication, touch log information 282 which is log information of communication in which the first communication section 141 is used, content log information 283 which is log information regarding the used content and capability information 284 of the portable telephone set 101 itself or the opposite party of communication are stored.

The memory access processing section 225 accesses, for example, the first communication section memory common region 263 through the security processing section 261 or accesses the portable telephone set memory 264 through the application program interface 262 as seen in FIG. 5.

Now, an example of a configuration of the capability information and so forth is described with reference to FIG. 6. The portable telephone set 101 delivers and accepts apparatus information and capability information by the first communication and delivers and accepts service cooperation information by the second communication. The apparatus information represents the apparatus type of each apparatus and represents, for example, that each apparatus is a portable telephone set or a vehicle-carried audio system. It is to be noted that, where the Bluetooth unit (BT) 161 is used as the second communication, setting information of Bluetooth communication may be used in place of the apparatus information.

The capability information includes the type (PHY) of a physical layer which can be used such as, for example, the Bluetooth unit 161 or the WiFi unit 162, a protocol which can be used such as, for example, the Bluetooth system or the DLNA (Digital Living Network Alliance) system, a profile which can be used by each protocol, and behavior setting for each profile which specifies what behavior should be taken locally/remotely after a connection is established. The capability information further includes, for each profile, local connection apparatus information of different apparatus such as a headset locally connected already, an apparatus state indicative of an existing power supply state, a communication connection state to the third party and so forth, application information relating to a usable application such as the name or the version of the application, a character code used for communication and so forth.

The service cooperation information includes a service ID which is identification information which specifies a service, the type of the service, a link URL to the service, a service option ID for identifying information relating to an option such as a discount applied in the service, position information representative of the touched position.

In this manner, the capability information includes information of the type of a usable physical layer, a usable (including a priority order) protocol, a profile and an application. If the portable telephone set 101 exchanges the capability information with the portable telephone set 102 of the opposite party of communication, then it can easily grasp the type of the second communication which the apparatus of the opposite party of communication has and can carry out appropriate setting. Further, if the portable telephone set 101 refers to the capability of the opposite party of communication, then it can specify an application which can be executed by the apparatus of the opposite party of communication, and can select and use an application which can be executed in accordance with the capacity of the opposite party of communication.

It is to be noted that the configuration of the capability information and the service cooperation information illustrated in FIG. 6 is an example and may include any other information which is not illustrated in FIG. 6. Further the configuration may omit a portion of information from each of the above described information. For example, an application which is managed with the capability information may be any application if it executes a predetermined processes based on information delivered and accepted to and from the opposite party of communication. For example, the application may be of the type which delivers and accepts information not with the second communication but with the first communication or with some other communication. Or, for example, the communication system of the second communication may be fixed while the information regarding the communication system of the second communication is omitted from the capability information.

From the foregoing, the portable telephone set 101 which can use a plurality of communication systems for the second communication can select, when it carries out handover, an appropriate communication method in accordance with the capacity of the opposite party as seen in FIG. 7.

In particular, referring to FIG. 7, where the opposite party of communication is a portable telephone set 102A which can use only the Bluetooth communication as the second communication, the portable telephone set 101 selects the Bluetooth communication as the communication method for the second communication based on the capability information and then exchange a profile which can be utilized from among profiles of the Bluetooth through the first communication. By this, it is possible to select an appropriate profile and implement operation expected by the application. Similarly, if the opposite party of communication is a portable telephone set 102B which can use only WiFi-authorized wireless communication as the second communication, the portable telephone set 101 selects the WiFi-authorized wireless communication as the communication method for the second communication based on the capability information. Then, in order to deliver and accept such information as music, moving pictures or a photograph, the portable telephone set 101 carries out setting of, for example, the DLNA. Further, if the opposite party of communication is a portable telephone set 103C which can execute both of the Bluetooth communication and the WiFi-qualified wireless communication as the second communication but is set such that it preferentially selects the Bluetooth communication, the portable telephone set 101 selects the Bluetooth communication as the communication method for the second communication based on the capability information. Then, the portable telephone set 101 exchanges a profile which can be utilized from among profiles of the Bluetooth through the first communication. Consequently, the portable telephone set 101 can select an appropriate profile and implement operation expected by the application.

Traditionally, where a plurality of communication systems can be used for communication as in the case of the portable telephone set 101, the user must select a communication system to be used in accordance with the function of the opposite party of communication. However, if capability information is exchanged and used as described above, then the portable telephone set 101 can carry out appropriate selection as seen in FIG. 7. Consequently, the portable telephone set 101 can reduce the setting operation of the user and the convenience of the application which involves communication can be improved.

Now, an example of a particular flow of processes is described. First, an example of a flow of a connection request side controlling process by the content cast application executed by the portable telephone set 101 of the side which issues a request for connection in the first communication is described with reference to FIG. 8.

Figure 8:
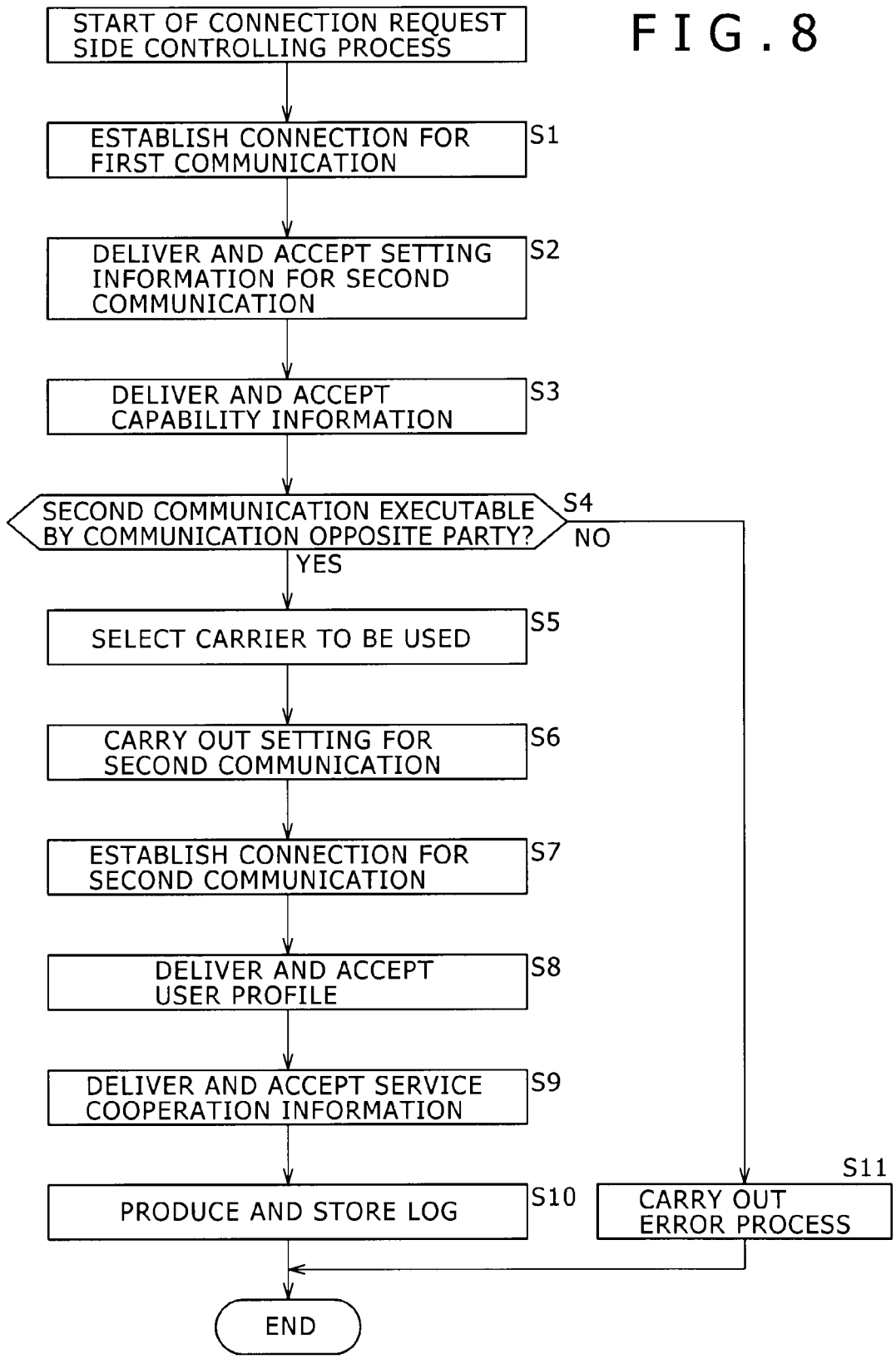
FIG. 8 is a flow chart illustrating an example of a flow of a connection request side control process executed by the portable telephone set shown in FIG. 1.
Figure 10A:
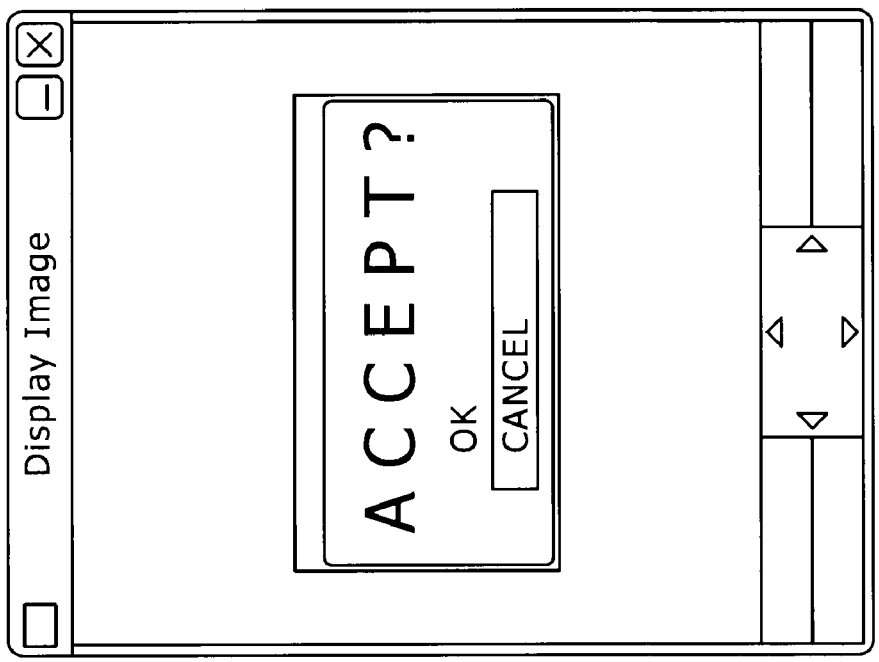
FIGS. 10A and 10B are schematic views showing examples of a screen image of the portable telephone set shown in FIG. 1.

For example, if the user of the portable telephone set 101 operates a "cast button" which is a GUI button displayed on a screen image of the portable telephone set 101 during execution of some other application, then the content cast application is started up, and "TOUCH" is displayed on the screen of the portable telephone set 101 as seen in FIG. 10A and the portable telephone set 101 enters a nearby operation waiting state. Then, if the user moves the portable telephone set 101 in this state to a position near to the portable telephone set 102 which should be the opposite party of communication, then the connection request side controlling process of FIG. 8 is started. Referring to FIG. 8, first at step S1, the first communication establishment section 231 communicates with the portable telephone set 102 positioned nearby and issues a request for a handover process to establish a connection for the first communication. The requesting method and the connection establishing method here rely upon the communication method for the first communication to be used. If the connection for the first communication is established, then the second communication setting information delivery and acceptance section 232 utilizes the first communication to deliver and accept setting information for the second communication at step S2. Further, the capability information delivery and acceptance section 233 utilizes the first communication to deliver and accept the mutual capability information similarly. The delivery and acceptance method of the information relies upon the communication method of the first communication. The information accepted is stored into the portable telephone set memory 264 such as the storage section 123.

At step S4, the second communication setting section 234 decides based on the acquired capability information of the opposite party of communication whether or not the opposite party of communication can execute the second communication. If it is decided that the portable telephone set 102 of the opposite party of communication has a second communication section and can communicate, then the second communication setting section 234 advances the processing to step S5, at which it selects a communication system or carrier to be used based on the capability information as described hereinabove with reference to FIG. 7 and carries out detailed setting of a protocol.

After an optimum communication system is selected as the second communication based on the capability information of the portable telephone set 101 and the portable telephone set 102, the second communication setting section 234 carries out setting of the second communication at step S6. After preparations for the second communication are made, the second communication establishment section 235 establishes a connection for the second communication with the portable telephone set 102 positioned at a short distance at step S7. After the connection for the second communication is established, the user profile acquisition section 241 makes use of the second communication to acquire the user profile from the opposite party of communication at step S8. At this time, if a request is received from the opposite party side of communication, also provision of the user profile of the portable telephone set 101 itself is carried out. At step S9, the service cooperation information acquisition section 242 utilizes the second communication to acquire service cooperation information from the opposite party of communication. At this time, if a request is received from the opposite party side of communication, then also provision of service cooperation information of the portable telephone set 101 itself is carried out.

After delivery and acceptance of the meta information are carried out as described above, the handover log production section 236 produces a log at step S10, stores the log into the portable telephone set memory 264 such as the storage section 123 and then ends the connection request side controlling process.

On the other hand, if it is decided at step S4 that the opposite party of communication cannot execute the second communication with the portable telephone set 101 itself, then the handover control portion 221 carries out an error process at step S11 and ends the connection request side controlling process.

Figure 9:
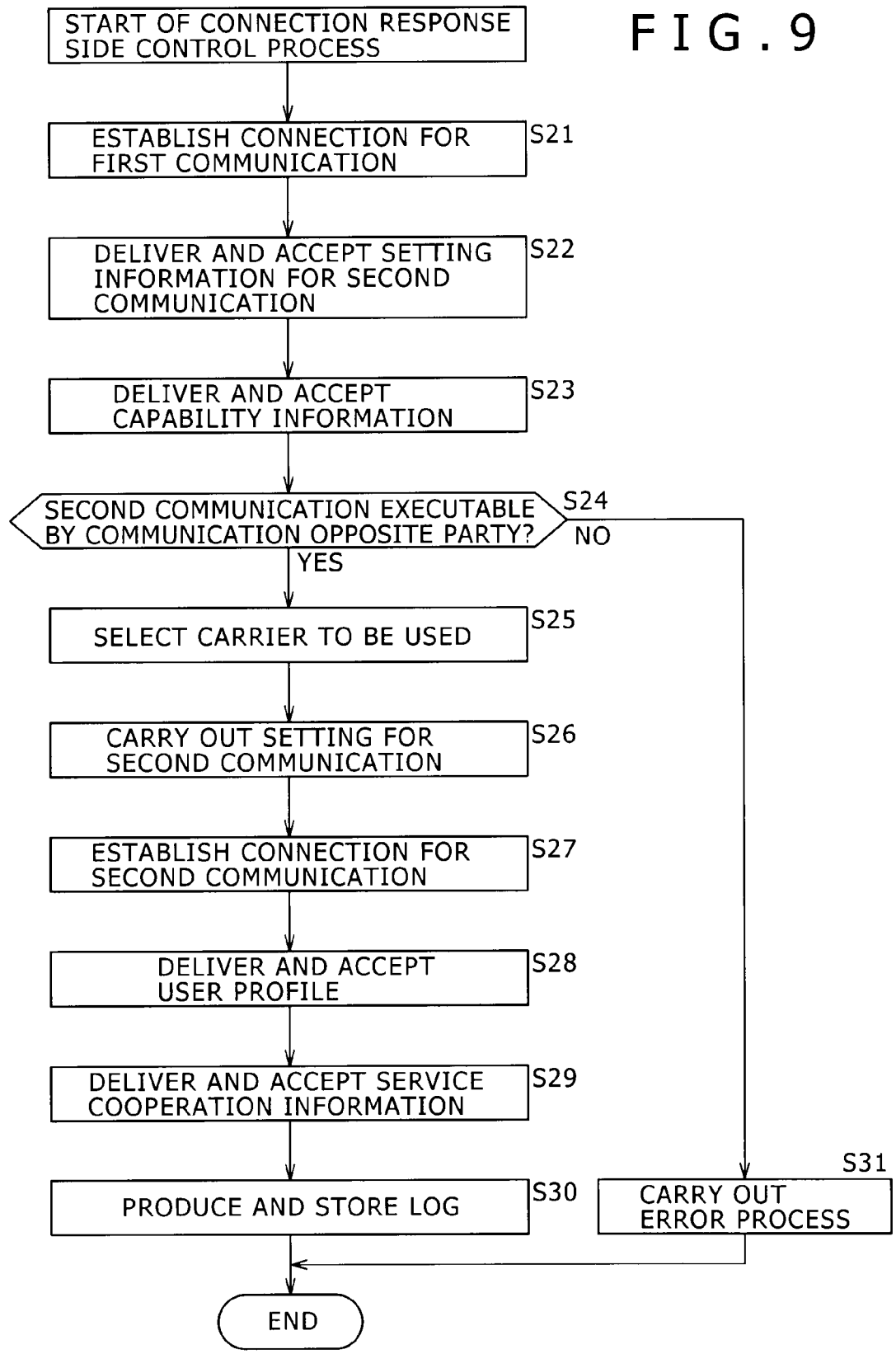
FIG. 9 is a flow chart illustrating an example of a flow of a connection response side control process executed by another portable telephone set shown in FIG. 1.

Now, an example of a flow of a correction response side controlling process by the content cast application executed by the portable telephone set 102 side to which a request for a handover process is issued is described with reference to FIG. 9.

Figure 10B:
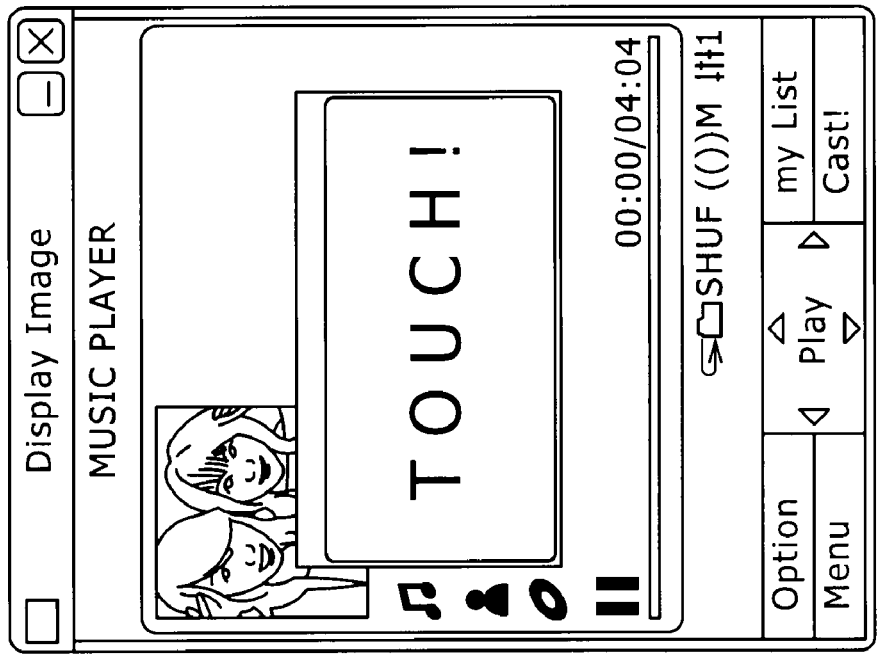

If the portable telephone set 101 wherein the content cast application is in the nearby operation waiting state is moved near to the portable telephone set 102, then the handover processing section 204 of the portable telephone set 102 receives a request for handover from the portable telephone set 101 through the first communication section 141 and establishes, if possible, the first communication and starts up the content cast application 211. The GUI processing section 224 displays, for example, "ACCEPT?" on the screen thereof as seen in FIG. 10B to urge the user to select whether or not a handover process should be carried out. If the user selects "OK" and issues an instruction to start the handover process, then the handover control portion 221 starts the connection response side controlling process. The components of the handover control portion 221 which starts the connection response side controlling process execute various processes at steps S21 to S31 in a similar manner as at steps S1 to S11.

In particular, at step S21, the first communication establishment section 231 establishes a connection for the first communication corresponding to the process at step S1 of FIG. 8. Then at step S22, the second communication setting information delivery and acceptance section 232 delivers and accepts setting information for the second communication corresponding to the process at step S2 of FIG. 8. Then at step S23, the capability information delivery and acceptance section 233 carries out delivery and acceptance of capability information corresponding to the process at step S3 of FIG. 8.

At step S24, the second communication setting section 234 decides based on the acquired capability information of the opposite party of communication whether or not the opposite party of communication can execute the second communication similarly as at step S4 of FIG. 8. If the portable telephone set 101 of the opposite party of communication has the second communication section and can communicate, then the second communication setting section 234 advances the processing to step S25, at which it selects a communication system or carrier to be used based on the capability information similarly as at step S5 of FIG. 8. At this time, the selected communication system is the same as that selected by the portable telephone set 101 at step S5 of FIG. 8.

After an optimum communication system is selected in such a manner as described above, the second communication setting section 234 carries out, at step S26, setting for the second communication similarly as in the case at step S6 of FIG. 8. After preparations for the second communication are made, the second communication establishment section 235 establishes, at step S27, a connection for the second communication with the portable telephone set 101 positioned at a short distance corresponding to the process at step S7 of FIG. 8.

After the connection for the second communication is established, the user profile acquisition section 241 utilizes, at step S28, the second communication to acquire the user profile from the opposite party of communication corresponding to the process at step S8 of FIG. 8. At this time, if a request is received from the opposite party of communication, then also provision of the user profile of the portable telephone set 102 itself is carried out. The service cooperation information acquisition section 242 makes use, at step S29, of the second communication to acquire service cooperation information from the opposite party of communication corresponding to the process at step S9 of FIG. 8. At this time, if a request is received from the opposite party of communication, then also provision of the service cooperation information of the portable telephone set 102 itself is carried out.

After the delivery and acceptance of the meta information are carried out in such a manner as described above, the handover log production section 236 produces, at step S30, a log and stores the log into the portable telephone set memory 264 such as the storage section 123 similarly as at step S10 of FIG. 10. Thereafter, the connection response side controlling process is ended.

On the other hand, if it is decided at step S24 that the opposite party of communication cannot executes the second communication with the portable telephone set 102 itself, then the handover control portion 221 carries out, at step S31, an error process similarly as at step S11 of FIG. 8 and then ends the connection response side controlling process.

Since the portable telephone set 101 and the portable telephone set 102 operate in cooperation with each other to deliver and accept the capability information and carry out a handover process based on the capability information, each of the portable telephone set 101 and the portable telephone set 102 can select an appropriate communication system in response to the capacity of the opposite party of communication and establish a connection for the second communication as seen in FIG. 7. Consequently, a setting operation of the user can be omitted, and the convenience of the application which uses the second communication can be improved.

The capability information can be utilized not only for such establishment of the second communication as described above but also for setting or effective use of an application. In particular, the portable telephone set 101 allows an application to operate appropriately in accordance with the capacity of the apparatus of the opposite party of communication based on the capability information. Consequently, an unnecessary setting operation and so forth by the user can be omitted, and the convenience of an application which utilizes the second communication can be further improved.

Although it is optional in what manner the capability information is utilized and in what manner the application is controlled based on the information, representative examples are described below.

FIGS. 11A to 11C illustrate a manner of the first example. If the portable telephone set 101 starts up a music player application 212A and, during reproduction music data, a content cast application 211A is started up by depression of the "cast button" or the like as seen in FIG. 11A, then a handover process is carried out as described. Consequently, a content cast application 211B of the portable telephone set 102 is started up and the music data during reproduction are transmitted as streaming data, that is, by streaming transmission. The content cast application 211B of the portable telephone set 102 starts up a music player application 212B, and when it receives the streaming data, it supplies the streaming data to the music player application 212B so as to be reproduced.

In such a process as just described, where the opposite party of communication is a portable telephone set 301 similar to the portable telephone set 102, the portable telephone set 101 carries out, for example, reproduction outputting of the music data while carrying out the streaming transmission to the portable telephone set 301 as seen in FIG. 11B. In this instance, sound is outputted from both of the portable telephone set 101 which is the transmission source and the portable telephone set 301 of the transmission destination.

Such a portable telephone set 301 as described above is in most cases so low in the sound outputting capacity that it is basically difficult for a large number of people to enjoy the reproduced and outputted music. Particularly because the portable telephone set 301 is a portable apparatus, it is frequently utilized while the user is out or in a like case or is frequently utilized, for example, together with a headphone mounted on the head of the user. Therefore, sound is outputted also from the portable telephone set 101 of the transmission source as described above. Consequently, both of the user of the transmission source and the user of the transmission destination can enjoy music using the respective portable telephones. In other words, the portable telephone set 101 can provide the music sharing service appropriately.

In contrast, where the opposite party of communication is, for example, an apparatus having a high reproduction output capacity like an audio compo 302 as seen in FIG. 11C, the portable telephone set 101 stops reproduction outputting of music data and carries out only streaming transmission to the audio compo 302. Where the reproduction outputting capacity of the device of the transmission destination is high, it is possible to share the reproduced and outputted music comfortably among a large number of people. In such an instance, the portable telephone set 101 of the transmission source need not reproduce or output music data. Conversely, there is the possibility that the sound outputting may be unnecessary. Accordingly, the portable telephone set 101 can provide the music sharing service appropriately by stopping outputting of the sound.

Since the portable telephone set 101 carries out such operation control based on the capability information without a selection operation of the user, the convenience of the application can be improved.

Figure 12:
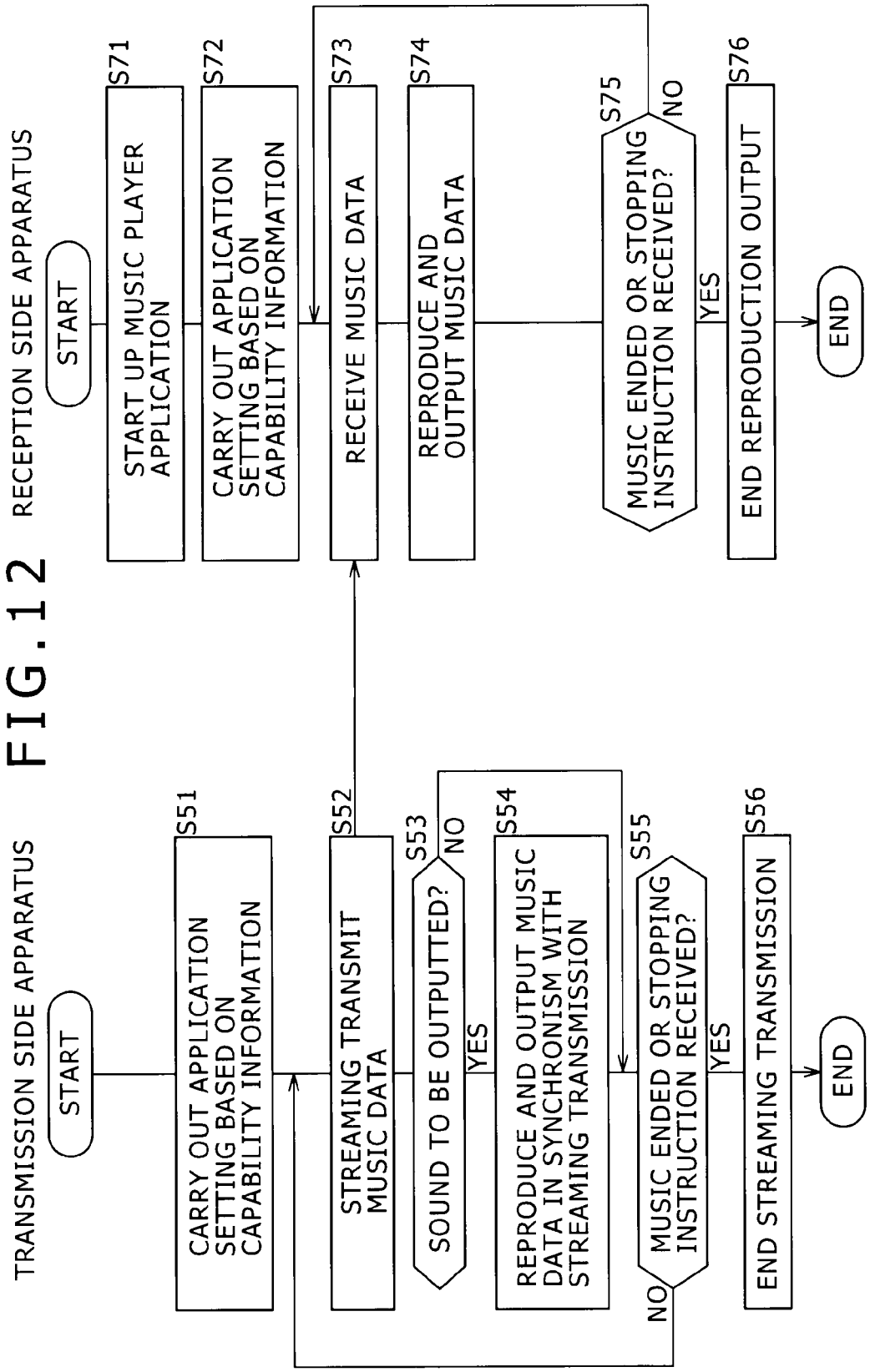
FIG. 12 is a flow chart illustrating an example of a flow of the control process for the application control of FIGS. 11A to 11C.

A flow of such a control process as just described is described in detail with reference to FIG. 12. It is to be noted that, in the following description, the transmission side apparatus is the portable telephone set 101 and the reception side apparatus is the portable telephone set 301 or the audio compo 302 based on the example described hereinabove with reference to FIGS. 11A to 11C. It is to be noted that, in the following description, it is assumed that the reception side apparatus has a configuration basically similar to that of the transmission side apparatus, that is, the portable telephone set 101.

Figure 13B:
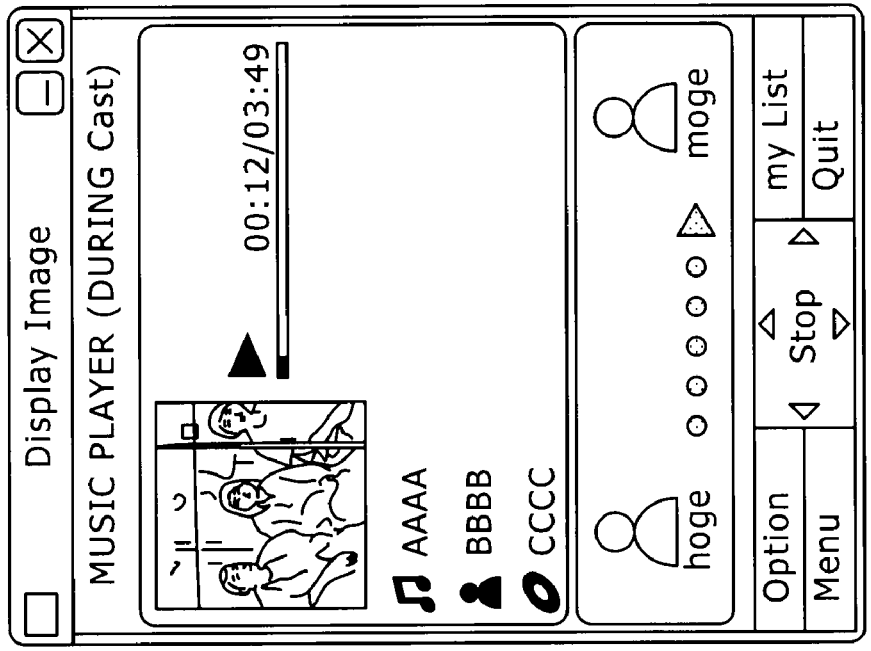
FIGS. 13A and 13B are schematic views showing examples of a screen image used in the flow of the control process of FIG. 12.
Figure 13A:
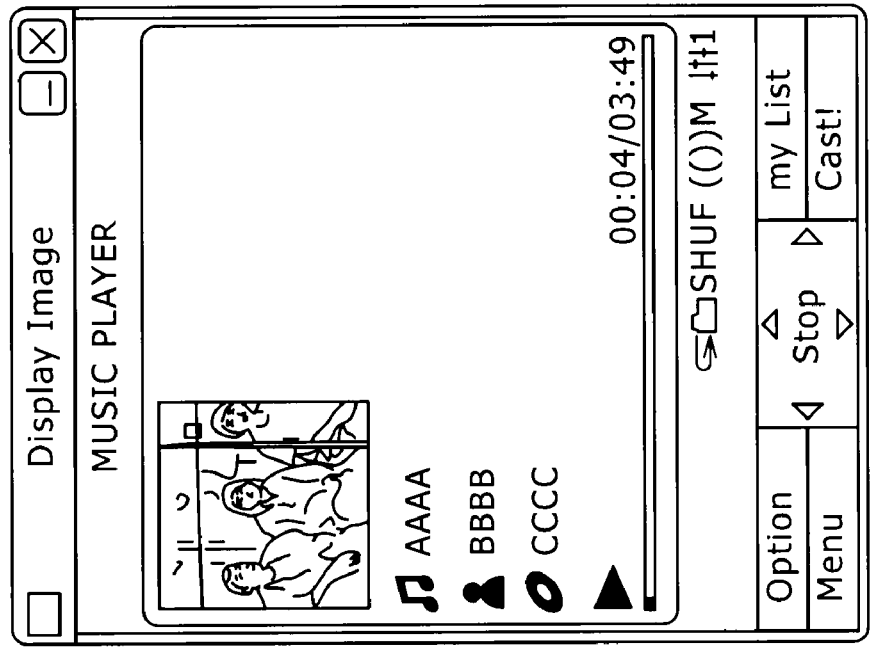

If the user selects the "cast button (Cast!)" while the music player application reproduces and outputs music data of the title of the music composition "AAAA," the singer "BBBB" and the album name "CCCC" as seen from an example of a screen image shown in FIG. 13A, then the content cast application 211 is started up as seen from an example of a screen image shown in FIG. 13B. Thus, a handover process is carried out and streaming transmission of the music data is started as described above.

The application setting section 251 of the content cast application 211A of the transmission side apparatus, that is, the portable telephone set 101, which has established the second communication as described hereinabove with reference to FIG. 8 carries out such application setting as to streaming transmit music data or determine whether or not the sound outputting should be continued based on the capability information at step S51.

It is to be noted that, at this time, whether or not the sound outputting should be continued is determined depending upon the sound outputting capacity of the reception side apparatus. Although the determination method in this instance is optional as far as the capability information is referred to for the determination, for example, the capability information may include some parameter indicative of the sound outputting capacity such that the transmission side apparatus makes a decision based on the value of the parameter. Or, the sound outputting may be stopped or continued only when the reception side apparatus is an apparatus registered in advance in the capability information.

In contrast, the application cooperation section 252 of the content cast application 211B of the reception side apparatus, that is, the portable telephone set 301 or the audio compo 302, which has established the second communication as described hereinabove with reference to the flowchart in FIG. 9, starts up the music player application 212B at step S71. Then, at step S72, the application setting section 251 carries out such application setting as to reproduce and output the received streaming data based on the capability information.

After preparations are made, the application cooperation section 252 of the transmission side apparatus acquires music data being reproduced from the music player application 212A and streaming transmits the acquired music data to the reception side apparatus at step S52. The application cooperation section 252 of the reception side apparatus receives the music data and controls the music player application 212B at step S73, and causes the music data supplied thereto to be reproduced and outputted from the speaker at step S74.

On the other hand, the application cooperation section 252 of the transmission side apparatus decides based on the application setting at step S53 whether or not sound should be outputted. If it is decided that the reception side apparatus is the portable telephone set 301 and outputs sound, then the processing advances to step S54, at which the application cooperation section 252 controls the music player application 212A so that also the transmission side apparatus reproduces and outputs the music data in synchronism with the streaming transmission. On the other hand, if it is decided at step S53 that the reception side apparatus is, for example, the audio compo 302 and does not output sound, then the process at step S54 is omitted and the processing advances to step S55.

At step S55, the application cooperation section 252 of the transmission side apparatus controls the music player application 212A to decide whether or not the music ended or it is decided whether or not an instruction to stop reproduction is issued by the user. If it is decided that the music does not end and no stopping instruction is issued, then the processing is returned to step S52 to repeat the processes at the steps beginning with step S52 to continue the reproduction and the transmission.

If it is decided at step S55 that the music ends or a stopping instruction is received, then the application cooperation section 252 of the transmission side apparatus advances the processing to step S56, at which the streaming transmission is ended.

In contrast, the application cooperation section 252 of the reception side apparatus controls the music player application 212B at step S75 to decide whether or not the music ends or a reproduction stopping instruction is issued by the user. If it is decided that the music does not end and no stopping instruction is issued either, then the processing is returned to step S73 to repeat the processes at the steps beginning with step S73 to repeat the reception and the reproduction. If it is decided at step S75 that the music ends or a stopping instruction is received, then the application cooperation section 252 of the reception side apparatus advances the processing to step S76, at which the streaming transmission is ended.

By such control, the operation of the transmission side apparatus can be controlled appropriately in accordance with the capacity of the opposite party of communication, and the convenience of the application can be improved.

Now, a second example is described. FIG. 14 illustrates a manner of the second example. As seen in FIG. 14, also it is possible for apparatus which are connected to each other by a handover process to execute different applications from each other. Referring to FIG. 14, in the example illustrated, a playlist management application 214A is started up in the portable telephone set 101, and if the user selects the "cast button" while the user refers to a list of playlists, then a content cast application 211A is started up and a handover process with the portable telephone set 102 is carried out. Consequently, a content cast application 211B of the portable telephone set 102 is started up and streaming transmission of music data is started in accordance with the playlist selected by the user. The content cast application 211B of the portable telephone set 102 which is the reception side apparatus starts up a music player application 212 and receives the music data streaming transmitted thereto and then causes a music player application 212B to reproduce and output the music data.

In such a process as described above, the content cast application 211A of the portable telephone set 101 confirms based on the capability information of the portable telephone set 102 that the portable telephone set 102 can execute the music player application 212B and carries out streaming transmission.

An example of a flow of processes in this instance is described with reference to FIG. 15. In the following description, it is assumed that the transmission side apparatus is the portable telephone set 101 and the reception side apparatus is the portable telephone set 102 in accordance with the example of FIG. 14.

Figure 16A:
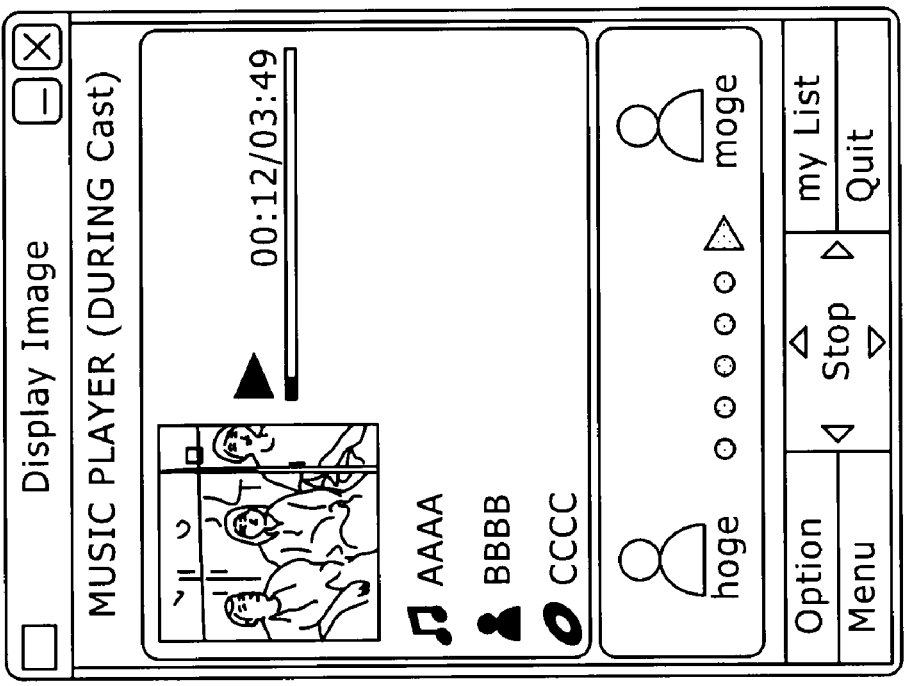
FIGS. 16A and 16B are schematic views showing examples of a screen image used in the flow of the control process of FIG. 15.
Figure 16B:
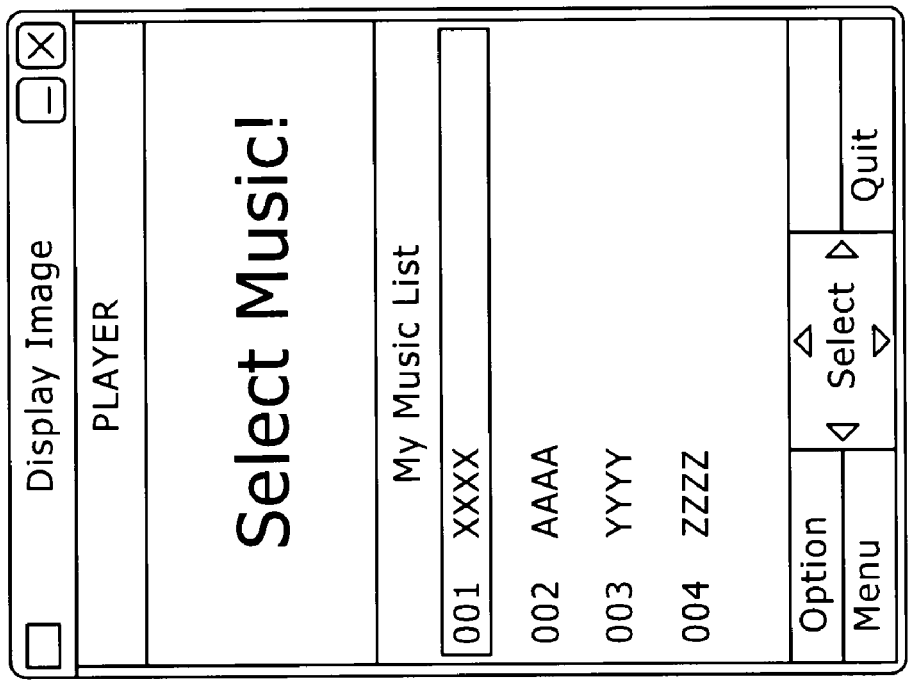

If the user selects a "cast button (Cast!)" while such a playlist as seen in FIG. 16A which shows an example of a screen image is displayed by the playlist management application 214A, then the content cast application 211 is started up as seen from an example of a screen image shown in FIG. 16B. Consequently, a handover process is carried out as described hereinabove, and where the reception side apparatus can execute the music player application 212B, streaming transmission of music data is started in accordance with the selected playlist.

The application setting section 251 of the content cast application 211A of the transmission side apparatus which has established the second communication as described hereinabove with reference to FIG. 8 confirms based on the capability information at step S101 whether or not the apparatus of the opposite party of communication can execute the music player application 212B. If the apparatus of the opposite party of communication can execute the music player application 212B, then the application setting section 251 carries out application setting so as to carry out streaming transmission of the music data in accordance with the order of the playlist.

In contrast, the application cooperation section 252 of the content cast application 211B of the reception side apparatus which has established the second communication as described hereinabove with reference to FIG. 9 starts up the music player application 212B at step S121. Then at step S122, the application setting section 251 carries out application setting based on the capability information so as to reproduce and output the received streaming data.

After preparations are made, the application cooperation section 252 of the transmission side apparatus selects, at step S102, a musical composition in accordance with the playlist selected by the user by the playlist management application 214A. Then at step S103, the application cooperation section 252 streaming transmits the selected music data to the reception side apparatus. The application cooperation section 252 of the reception side receives the music data and controls the music player application 212B at step S123 and causes the music data supplied thereto to be reproduced so as to be outputted from the speaker at step S124.

Meanwhile, the application cooperation section 252 of the transmission side apparatus decides at step S104 whether or not the music ends, and repeats the process at step S103 until it is decided that the music ends. Then, if it is decided that the music ends, then the processing advances to step S105, at which the application cooperation section 252 decides whether or not the ended music is the last musical composition of the playlist. If it is decided that the ended music is not the last musical composition, then the application cooperation section 252 returns the processing to step S102, at which it selects another musical composition based on the playlist and carries out streaming transmission of the newly selected musical composition. In this manner, the processes at steps S102 to S105 are repeated, and if it is decided at step S105 that the last musical composition of the playlist is streaming transmitted, then the application cooperation section 252 advances the processing to step S106, at which it ends the streaming transmission.

Meanwhile, the application cooperation section 252 of the reception side apparatus controls the music player application 212B at step S125 to decide whether or not the music ends or a reproduction stopping instruction is issued by the user. If it is decided that the music does not end and no stopping instruction is received either, then the processing returns to step S123 so that the processes at the steps beginning with step S123 are repeated to continue the reception and the reproduction. If it is decided at step S125 that the music ends or a stopping instruction is received, then the application cooperation section 252 of the reception side apparatus advances the processing to step S126, at which it ends the streaming transmission.

By such control as described above, an appropriate application different from an application which is being executed by the transmission side apparatus can be caused to be executed by the reception side apparatus without an instruction of the user. Consequently, the application can provide various services, and the convenience of the application can be further improved.

Now, a third example is described. FIG. 17 illustrates a manner of the third example. Also it is possible to connect one apparatus to a plurality of different apparatus by a handover process as seen in FIG. 17. Referring to FIG. 17, in the example illustrated, an audio compo 312 carries out the second communication with portable telephone sets 101A to 101C to acquire playlists from the portable telephone sets 101A to 101C, causes music data to be streaming transmitted in accordance with the order of the playlists from the portable telephone sets 101A to 101C and reproduces and outputs the received music data.

In particular, while the playlist management application 214A is executed by the portable telephone set 101A, the user depresses the "cast button" to start up the content cast application 211A and then holds up the housing of the portable telephone set 101A above and near to the audio compo 312 to establish the first communication. Thereafter, the handover process is executed by the first communication to establish the second communication and registers the playlist into the audio compo 312.

Similarly, while a playlist management application 214B is executed by the portable telephone set 101B, the user depresses the "cast button" to start up the content cast application 211B and then holds up the housing of the portable telephone set 101B above and near to the audio compo 312 to register the playlist into the audio compo 312. Further, while a playlist management application 214C is executed by the portable telephone set 101C, the user depresses the "cast button" to start up the content cast application 211C and then holds up the housing of the portable telephone set 101C above and near to the audio compo 312 to register the playlist into the audio compo 312 similarly.

The audio compo 312 starts up the content cast application 211D in response to such an operation as described above to execute a handover process to establish the second communication, and then starts up a playlist management application 214D to store the playlists supplied thereto from the portable telephone sets 101A to 101C. Then, the audio compo 312 causes the content cast application 211D to select music data in accordance with the order of each playlist registered in the playlist management application 214D, cause the selected music data to be streaming transmitted from the apparatus of the playlist transmission source, and starts up a music player application 212D to reproduce and output the received music data.

Also in this instance, although the transmission side apparatus and the reception side apparatus execute different applications from each other similarly as in the second example, since the transmission apparatus and the reception apparatus set and operate an application in accordance with the capacity of the opposite party of communication based on the capability information, such a music sharing service as described above can be implemented without the necessity for a setting operation by the user. Thus, a reproduction service of music data can be shared by more people by using the audio compo 312 without the necessity for a setting operation by the user. Consequently, the convenience of the application is improved.

An example of a flow of processes in this instance is described below with reference to FIG. 18. In the following description, it is assumed that the transmission side apparatus is the portable telephone set 101A and the reception side apparatus is the audio compo 312 in accordance with the example described hereinabove with reference to FIG. 17. It is to be noted that the audio compo 312 has a configuration basically similar to that of the portable telephone set 101 while only processes carried out by an executed application are different.

The application setting section 251 of the content cast application 211A of the transmission side apparatus which has established the second communication as described hereinabove with reference to FIG. 8 confirms, at step S141, based on the capability information whether or not the apparatus of the opposite party of communication can execute the music player application 212D and the playlist management application 214D. If it is decided that the apparatus of the opposite party of communication can execute the music player application 212D and the playlist management application 214D, then the application setting section 251 transmits a playlist and further carries out application setting so as to streaming transmit the music data in accordance with a request of the reception side apparatus.

On the other hand, the application cooperation section 252 of the content cast application 211D of the reception side apparatus which has established the second communication as described hereinabove with reference to FIG. 9 starts up the music player application 212D and the playlist management application 214D at step S161. Then at step S162, the application setting section 251 registers the received playlist and carries out selection of a musical composition in accordance with the musical composition order of the registered playlist based on the capability information. Then, the application setting section 251 issues a request to the transmission source of the playlist to streaming transmit the selected musical composition and carries out application setting so that the received streaming data is reproduced and outputted.

After preparations are made, the application cooperation section 252 of the transmission side apparatus transmits, at step S142, in accordance with the request from the reception side apparatus, the playlist selected by the user in the selected playlist management application 214A to the reception side apparatus. The application cooperation section 252 of the reception side apparatus receives the playlist and controls the playlist management application 214D to store the playlist at step S163.

After the playlists from the various apparatus are registered in this manner, the application cooperation section 252 of the reception side apparatus controls, at step S164, the playlist management application 214D to select a musical composition to be reproduced based on the musical composition order of the registered playlist. Then at step S165, the application cooperation section 252 issues a request for music data of the selected musical composition to the transmission side apparatus. Which one of the apparatus has the music data is determined from the transmission source of the playlist which includes the musical composition.

When the application cooperation section 252 of the transmission side apparatus acquires the request at step S143, it streaming transmits the designated music data at step S144. The application cooperation section 252 of the reception side apparatus receives the music data and controls the music player application 212D to reproduce and output the music data at step S166.

At step S167, the application cooperation section 252 of the reception side apparatus controls the playlist management application 214D to decide whether or not all musical compositions of the registered playlist are reproduced. If it is decided that some musical component which is not reproduced as yet remains, then the processing is returned to step S164 so that the processes at the steps beginning with step S164 are executed repetitively. If it is decided at step S167 that all musical compositions are reproduced, then the application cooperation section 252 of the reception side apparatus advances the processing to step S168, at which it controls the music player application 212D to end the reproduction and outputting of music data.

On the other hand, if the process of streaming transmission at step S144 ends, then the application cooperation section 252 of the transmission side apparatus advances the processing to step S145, at which the streaming transmission is ended.

By such control, it becomes possible to carry out a handover process with a plurality of opposite parties of communication without an instruction of the user. Further, it is possible to cause the reception side apparatus to execute an appropriate application different from an application, which is executed by the transmission side apparatus, in accordance with the capacity of the opposite party of communication. Consequently, the application can provide various services, and the convenience of the application can be further improved.

Now, a fourth example is described. FIGS. 19A and 19B illustrate a manner of the fourth example. As seen in FIGS. 19A and 19B, where an apparatus can use a plurality of kinds of content data, based on the capability information, the apparatus may grasp content data which can be handled by applications which can be executed by the opposite party of communication and select content data to be used.

For example, if the content cast application 211A is started up while the portable telephone set 101 which serves as the transmission side apparatus is executing a multiplayer application 215A which can use various kinds of content data such as music data, image data and text data, then where the portable telephone set 102 which serves as the reception side apparatus can execute only the music player application 212B in addition to the content cast application 211B, the content cast application 211A carries out streaming transmission of the music data being reproduced by the multiplayer application 215A.

Further, where a printer 322 which serves as the reception side apparatus can execute only a printing control application 216B in addition to the content cast application 211B, the content cast application 211A transmits word data of the musical composition of the music data, that is, text data, and jacket image data, that is, image data, being reproduced by the multiplayer application 215A so that the words of the musical composition and the jacket image are printed by the printer 322.

In this manner, the portable telephone set 101 varies the processing substance of an application executed by the portable telephone set 101 itself in response to the capacity of the opposite party of communication to vary content data to be handled. By this, it becomes possible to provide various services without the necessity for setting operations by the user, and the convenience of the application is improved.

An example of a flow of processes in this instance is described with reference to FIG. 20. It is to be noted that, in the following description, it is assumed that the transmission side apparatus is the portable telephone set 101 and the reception side apparatus is the printer 322 in accordance with the example of FIG. 19B. It is to be noted that, in the following description, functions which the printer 322 has are basically similar to those of the portable telephone set 101 except that only a printing control application 216 can be executed by the printer 322.

The application setting section 251 of the content cast application 211A of the transmission side apparatus which has established the second communication as described hereinabove with reference to FIG. 8 carries out application setting based on the capability information at step S181. At this time, the application setting section 251 confirms from the capability information that the reception side apparatus can execute only the printing control application 216B and carries out application setting so that word data of the musical composition, that is, text data, and jacket image data, that is, image data, being reproduced by the multiplayer application 215A, are transmitted so as to be printed.

Meanwhile, the application cooperation section 252 of the content cast application 211B of the reception side apparatus which has established the second transmission as described hereinabove with reference to the flowchart in FIG. 9 starts up the printing control application 216B at step S191. Then at step S192, the application setting section 251 receives such word data, that is, text data, and jacket image data, that is, image data, as described above and carries out application setting so that the received words and jacket images are printed.

After preparations are made, the application cooperation section 252 of the transmission side apparatus transmits word data of the musical composition, that is, text data, and jacket image data, that is, image data, being reproduced by the multiplayer application 215A, at step S182. The application cooperation section 252 receives the data at step S193 and controls the printing control application 216B so that the received text data and image data are printed at step S193.

By such control, the application can provide various services without an instruction of the user, and the convenience of the application can be further improved.

Naturally, the data to be printed may be any data and may be any other than word data and jacket image data. Further, while the foregoing description relates to printing, the process executed by the transmission destination of data may be different from printing, and also the reception side apparatus may not be a printer.

Figure 21:
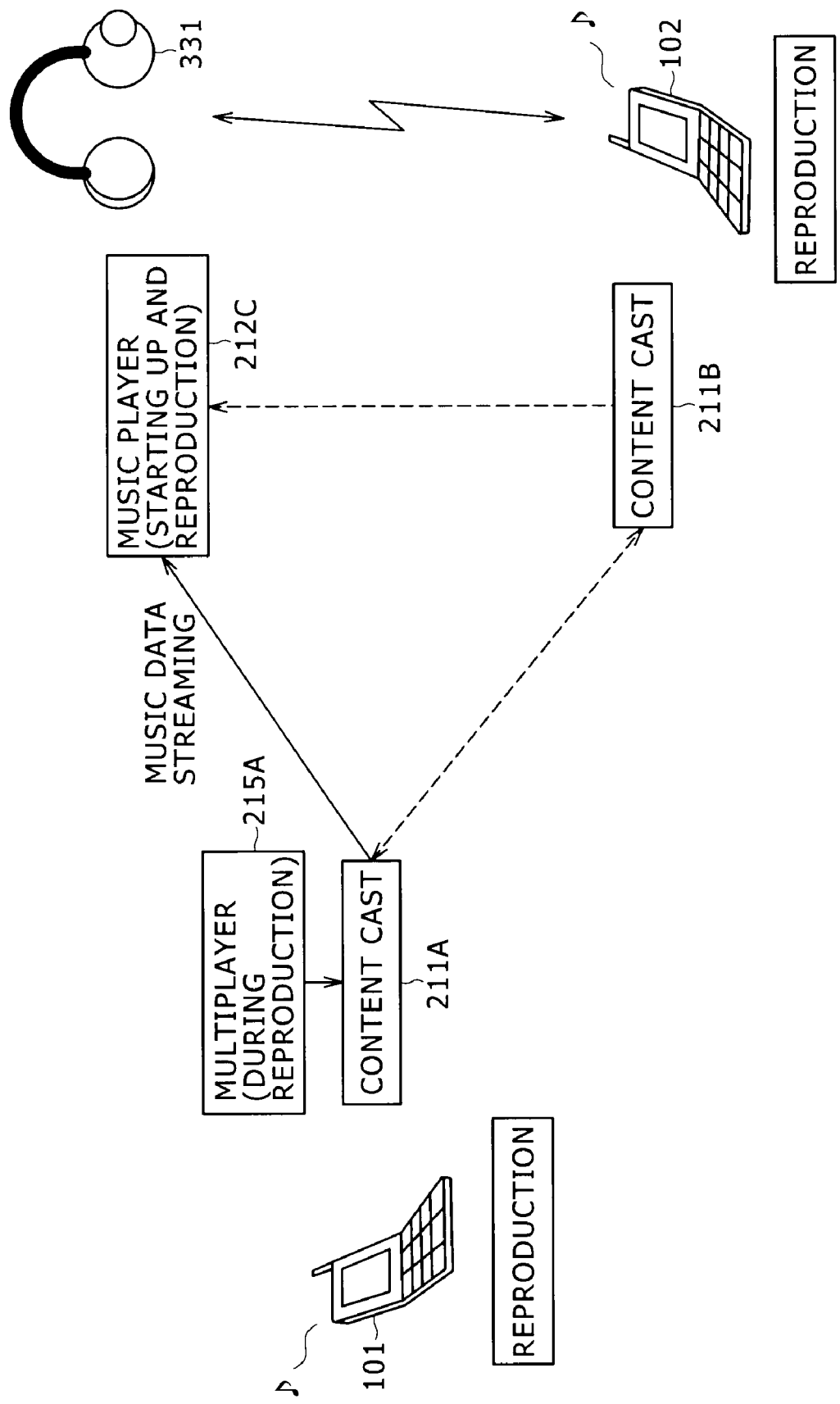
FIG. 21 is a block diagram illustrating a fifth example of application control by the portable telephone set shown in FIG. 1.

Now, a fifth example is described. FIG. 21 illustrates a manner of the fifth example. For example, if the portable telephone set 102 which is the reception side apparatus uses a headset 331 having the Bluetooth communication function, then the portable telephone set 101 which transmits music data grasps this based on the capability information acquired by the portable telephone set 102. Thus, the portable telephone set 101 can transmit the music data not to the portable telephone set 102 but to the headset 331.

The headset 331 can execute a music player application 212C and reproduce and output music data streaming transmitted thereto from the content cast application 211 by the Bluetooth communication or second communication. On the other hand, when the portable telephone set 102 reproduces the music data, it uses the content cast application 211B to streaming transmit the music data to the headset 331 by the Bluetooth communication without outputting sound. The capability information of the portable telephone set 102 includes setting of such applications.

The portable telephone set 101 establishes the first communication with the portable telephone set 102 to acquire the capability information from the portable telephone set 102. In particular, the capability information acquired from the portable telephone set 102 by the portable telephone set 101 includes information relating to the second communication and information relating to applications of the portable telephone set 102 and the headset 331, that is, information regarding the capacity of the plural apparatus. The portable telephone set 101 recognizes from the capability information that, even if music data is transmitted to the portable telephone set 102, it is transferred to the headset 331 and that the portable telephone set 101 can streaming transmit music data to the headset 331. Therefore, the portable telephone set 101 carries out setting of the content cast application 211A based on the capability information so that music data is transmitted to the headset 331.

Figure 22:
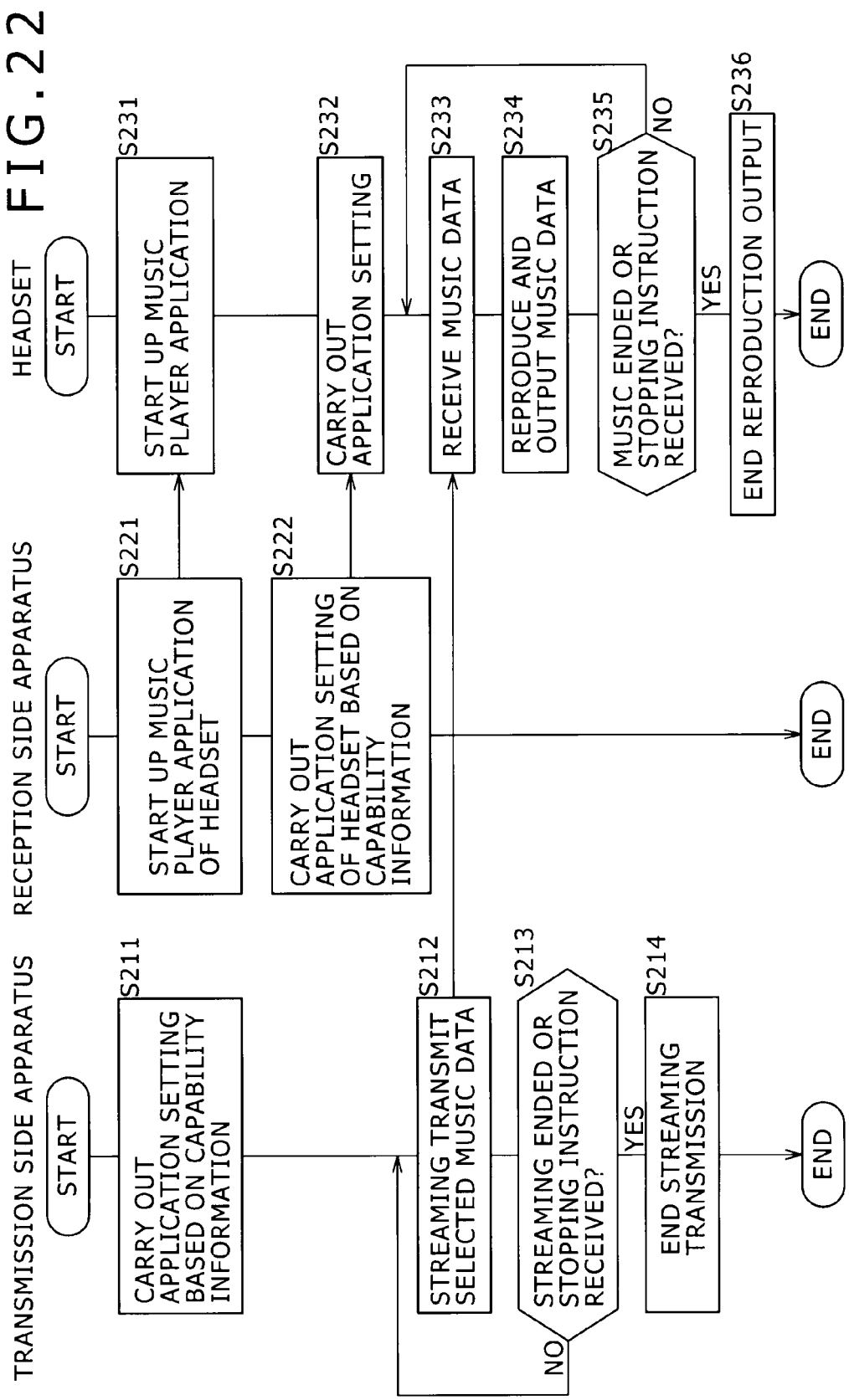
FIG. 22 is a flow chart illustrating an example of a flow of the control process for the application control of FIG. 21.

An example of a flow of processes in this instance is described below with reference to FIG. 22. In the following description, it is assumed that the transmission side apparatus is the portable telephone set 101 and the reception side apparatus are the portable telephone set 102 and the headset 331 in accordance with the example of FIG. 21.

The application setting section 251 of the content cast application 211A of the transmission side apparatus which has established the second transmission as described hereinabove with reference to the flowchart in FIG. 8 carries out application setting based on the capability information at step S211. At this time, the application setting section 251 confirms from the capability information that the reception side apparatus are the portable telephone set 102 and the headset 331 and music data is supplied from the portable telephone set 102 to the headset 331 such that the music data are reproduced and outputted by the headset 331. Then, the application setting section 251 carries out setting of an application so as to transmit the music data being reproduced by the multiplayer application 215A to the headset 331 so as to be reproduced and outputted.

It is to be noted that, in this instance, the portable telephone set 101 establishes a connection for the second communication with the opposite party of communication set to the headset 331 in order to transmit music data to the headset 331. In particular, the portable telephone set 101, that is, the second communication establish section 235, selects the headset 331 as the opposite party of communication decided at step S4 in the flow chart of FIG. 8 based on the capability information. Further, the portable telephone set 101 carries out the processes at steps S4 to S11 for the headset 331 as occasion demands based on the information, included in the capability information, of the communication system with which the headset 331 can communicate, thereby establishing a connection for the second communication with the headset 331. At step S211, the portable telephone set 101, that is, the application setting section 251, carries out, based on the information included in the capability information and regarding applications which can be executed by the headset 331, such application setting as to transmit music data being reproduced by the multiplayer application 215A so as to be reproduced and outputted.

In contrast, the reception side apparatus establishes a connection for the second communication with the portable telephone set 101 as described hereinabove with reference to FIG. 9. In particular, the portable telephone set 102 carries out the processes at steps S21 to S23 of FIG. 9 to exchange capability information and so forth with the portable telephone set 101 and causes the headset 331 to suitably execute the processes at steps S24 to S31 to establish a connection for the second communication with the portable telephone set 101. It is to be noted that a communication connection between the portable telephone set 102 and the headset 331 is established in advance. If no connection is established, then the portable telephone set 102 establishes a communication connection to the headset 331 first and then suitably causes the headset 331 to execute the processes at steps S24 to S31. After the processes described, the application cooperation section 252 of the content cast application 211B of the portable telephone set 102 causes the music player application 212C of the headset 331 to be started up at step S221. Corresponding to this process, the headset 331 starts up the music player application 212C at step S231.

At step S222, the application cooperation section 252 of the portable telephone set 102 carries out, based on the capability information, setting of the music player application 212C of the headset 331 such as to cause music data supplied from the portable telephone set 101 to be reproduced. In response to the process, the music player application 212C of the headset 331 carries out such application setting as to cause music data supplied from the portable telephone set 101 to be reproduced.

After preparations are made, the application cooperation section 252 of the portable telephone set 101 controls the multiplayer application 215A to transmit the music data selected by the user or the like to the headset 331 at step S212. The application cooperation section 252 of the portable telephone set 101 repeats the process at step S212 until after it is decided at step S213 that the streaming ends or a transmission stopping instruction is issued.

Meanwhile, the music player application 212C of the headset 331 receives the music data transmitted from the portable telephone set 101 at step S233 and then reproduces and outputs the music data at step S234. The music player application 212C repeats the processes at steps S233 and S234 until after it is decided at step S235 that the streaming ends or a reproduction stopping instruction is received.

If it is decided at step S213 that the streaming ends or a transmission stopping instruction is issued, then the application cooperation section 252 of the portable telephone set 101 advances the processing to step S214, at which it ends the streaming transmission.

Similarly, if it is decided at step S235 that the streaming ends or a reproduction stopping instruction is issued, then the music player application 212C of the headset 331 advances the processing to step S236, at which it ends the reproduction outputting.

By such control as described above, also where a plurality of apparatus are used as reception side apparatus, the portable telephone set 101 can transmit appropriate data to appropriate devices based on the capability information. Consequently, the processing efficiency can be improved and the load can be reduced, and the convenience of the application can be improved.

The description above relates to an example wherein the portable telephone set 102 and the headset 331 are used as reception side apparatus and the portable telephone set 101 is controlled so as to transmit music data to the headset 331 but not to the portable telephone set 102 based on the capability information. However, the reception side apparatus may be other apparatus than the apparatus described and also the substance of the communication control to be carried out for such reception side apparatus may be other than that described above. In other words, they are selected appropriately based on the capability information. Further, the number of apparatus used as reception side apparatus is optional.

It is to be noted that naturally the capability information may be used to carry out application setting and application control different from those described above. For example, the reception side apparatus may issue a request for handover as seen in FIG. 23.

Figure 23:
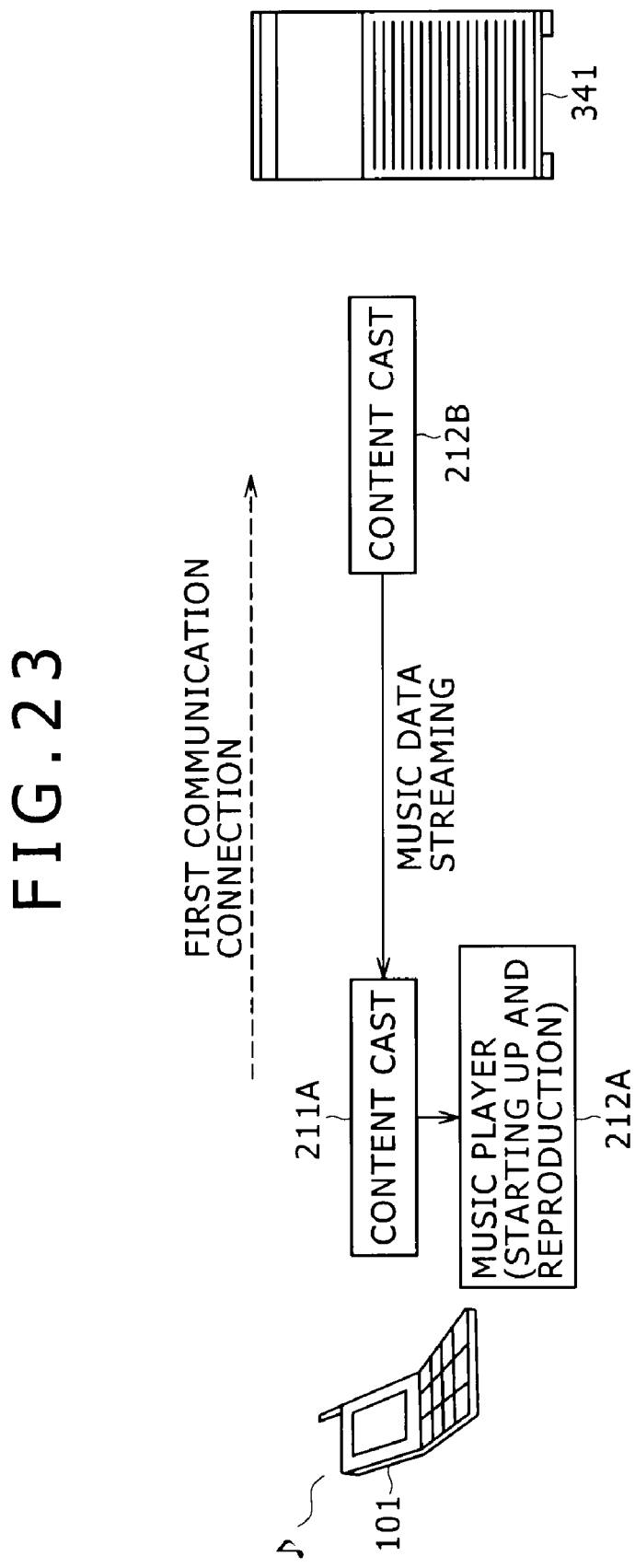
FIG. 23 is a block diagram illustrating a sixth example of application control by the portable telephone set shown in FIG. 1.

In the configuration shown in FIG. 23, if the user of the portable telephone set 101 starts up the content cast application 211A and moves the housing of the portable telephone set 101 to a position near to a communication device 341, which is currently executing a content cast application 211B such as, for example, an audition machine or a poster of a record shop, then music data transmitted from the communication device 341 can be received by the portable telephone set 101, by which it can be reproduced and outputted.

In this instance, the portable telephone set 101 carries out setting and control such that it grasps from the capability information of the opposite party of communication the fact that the communication device 341 as the opposite party of communication has only a function for transmitting music data, starts up a music player application 212A, receives the music data and reproduces and outputs the data. By such processes, the portable telephone set 101 can provide various services in accordance with the capacity of the opposite party of communication.

Figure 24:
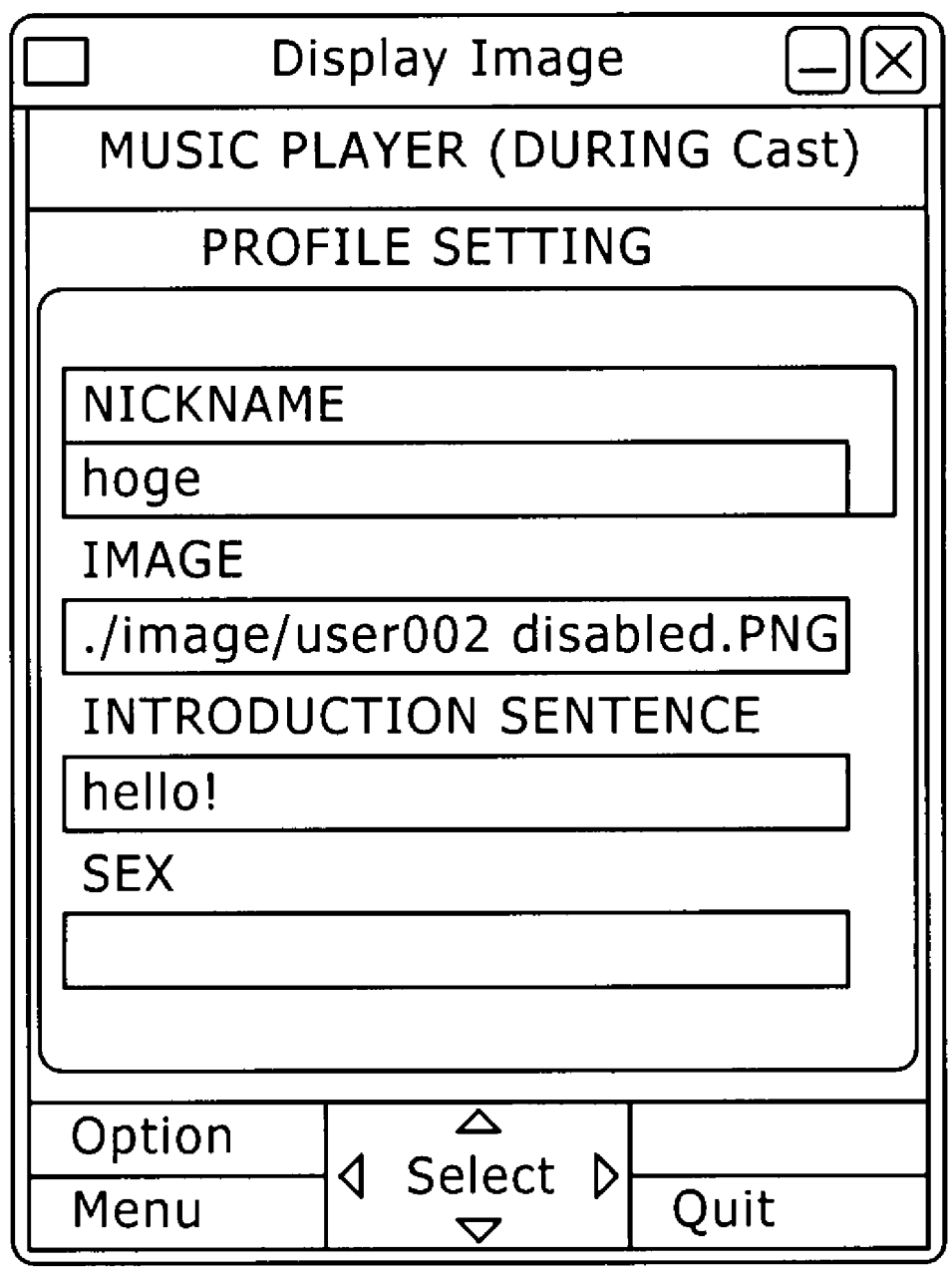
FIGS. 24 and 25A to 25C are schematic views showing examples of a screen image used by the portable telephone set shown in FIG. 1.

It is to be noted that the user profiles to be delivered and accepted by the user profile acquisition section 241 of the different apparatus may be set by the user. For example, such a GUI screen image as shown in FIG. 24 may be used such that the user can input personal information so that the information may be managed as a user profile.

Figure 25A:
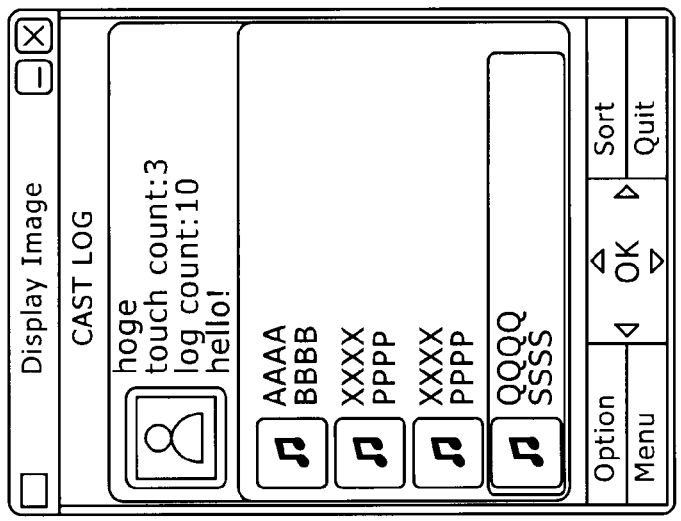
Figure 25B:
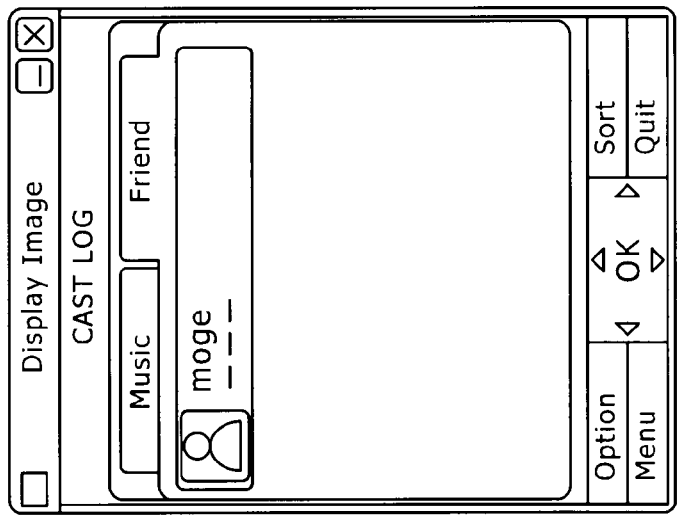
Figure 25C:
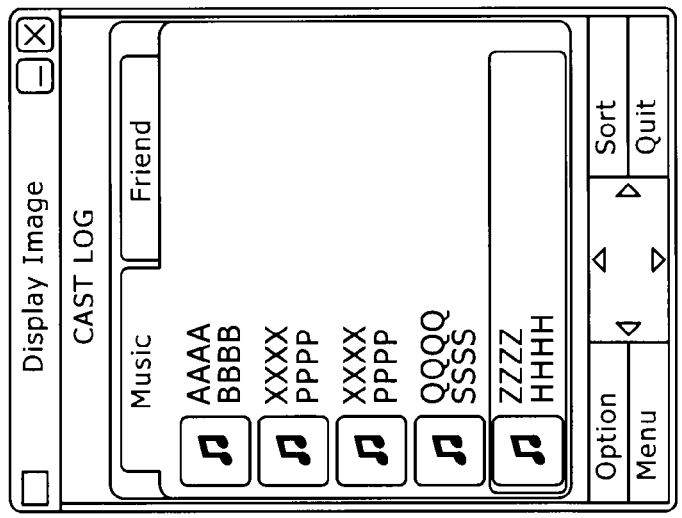

Further, a log of each application may be displayed, for example, as in the case of the music player application 212. FIGS. 25A to 25C show examples of a display screen of a log. The log display may be carried out such that, for example, reproduced and outputted musical compositions are displayed as a list or table as seen in FIG. 25A, or what process is carried out for each musical composition as seen in FIG. 25B, or else a history of streaming transmitted musical compositions is displayed as a list or table for each of opposite parties of communication of streaming transmission. Needless to add, the other display style can be applied.

It is to be noted that, while the series of processes described above can be executed by hardware, it may otherwise be executed by software. Where the series of processes is executed by software, a program which constructs the software is installed from a network or a recording media.

The recording medium is formed, for example, as a removable medium 131 such as, as shown in FIG. 2, a magnetic disc (including a floppy disc), an optical disc (including a CD-ROM and a DVD), or a magneto-optical disc (including an MD), or a semiconductor memory which has the program recorded thereon or therein separately from a computer. Else, the recording medium is formed as a ROM 112, a hard disc included in the storage section 123 or the like in which the program is recorded and which is provided in a state wherein the program is incorporated in an apparatus body.

It is to be noted that, in the present specification, the steps which describe the program recorded in a recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

It is to be noted that a configuration described as one apparatus in the foregoing description may be divided so as to be formed as a plurality of apparatus. On the contrary, a configuration described as a plurality of apparatus in the foregoing description may be formed collectively as a single apparatus. Naturally, a configuration other than those described above may be added to the configuration of the various apparatus described hereinabove. Furthermore, if the configuration or operation of the entire system is same, then part of a configuration of a certain apparatus may be included in a configuration of another apparatus. In short, the mode for carrying out the present invention is not limited to the embodiment described above, but various alterations and modifications are possible without departing from the spirit and scope of the present invention.

What is claimed is:

1. An information processing apparatus, comprising:
   first connection establishment means for controlling a first communication section, which can carry out a delivery and an acceptance of information to and from a different information processing apparatus positioned near to said information processing apparatus by a nearby wireless communication, to establish a connection for the nearby wireless communication;
   acquisition means for acquiring setting information for a short range wireless communication which exhibits a wider communication range than the nearby wireless communication and capability information regarding a capacity of the different information processing apparatus from the different information processing apparatus through the nearby wireless communication for which the connection is established by said first connection establishment means;
   second connection establishment means for controlling a second communication section, which carries out the short range wireless communication, based on the setting information acquired by said acquisition means to establish a connection for the short range wireless communication; and
   process execution means for executing a predetermined process based on information delivered to and accepted from the different information processing apparatus based on the capability information acquired by said acquisition means and including at least one of behavior setting information which specifies a behavior of said information processing apparatus or the different information processing apparatus, connection apparatus information regarding an apparatus connected to the different information processing apparatus, apparatus state information indicative of a state of the different information processing apparatus and application information regarding an application which can be executed by the different information processing apparatus, wherein the capability information includes the apparatus state information, the apparatus state information indicates an existing power supply state of the different information processing apparatus, the process execution means executes the predetermined process, through the short range wireless communication, based on the existing power supply state,
   the predetermined process provides a service to the different information processing apparatus based on the existing power supply state of the different information processing apparatus, and the service includes generating electromagnetic waves based on the existing power supply state of the different information processing apparatus.

2. The information processing apparatus according to claim 1, wherein the capability information includes information representative of a communication system of the short range wireless communication by a second communication section of the different information processing apparatus, and
   said second connection establishment means establishes the short range wireless communication in accordance with a communication system, which can be used for a communication by the different information processing apparatus, based on the setting information and the capability information.

3. The information processing apparatus according to claim 1, wherein said process execution means carries out, based on the application information included in the capability information, a setting of an application for executing a process based on information delivered and accepted through the short range wireless communication for which the connection is established by said second connection establishment means as the predetermined process.

4. The information processing apparatus according to claim 1, wherein the capability information includes information indicative, for each of a plurality of different information processing apparatuses, of a communication system for the short range wireless communication by the second communication section,
   said second connection establishment means being operable to select, based on the capability information, an opposite party of a communication for the short range wireless communication from among the plurality of the different information processing apparatuses and establish the short range wireless communication with the selected different information processing apparatus in accordance with a communication system that the selected different information processing apparatus can use for a communication.

5. The information processing apparatus according to claim 1, wherein the capability information includes the application information which is information indicative, for each of a plurality of different information processing apparatuses, of applications which can be executed,
   said second connection establishment means being operable to select an opposite party of a communication for the short range wireless communication from among the plurality of the different information processing apparatuses based on the capability information to establish the short range wireless communication,
   said process execution means carrying out, based on the application information indicated by the capability information and regarding the applications which can be executed by the different information processing apparatuses selected by said second connection establishment means, a setting of the application for executing a process, based on the information delivered and accepted through the nearby wireless communication, for which the connection is established by said second connection establishment means as the predetermined process.

6. The information processing apparatus according to claim 1, wherein said process execution means carries out, based on the capability information, a setting for transmitting information outputted from the different information processing apparatus or an apparatus connected to the different information processing apparatus through the short range wireless communication for which the connection is established by said second connection establishment means or a setting for outputting information transmitted from the different information processing apparatus through the short range wireless communication for which the connection is established by said second connection establishment means.

7. The information processing apparatus according to claim 1, further comprising:
transmission means for transmitting the setting information and the capability information to the different information processing apparatus through the nearby wireless communication for which the connection is established by said first connection establishment means.

8. The information processing apparatus according to claim 1, wherein the capability information includes at least two of the connection apparatus information, the apparatus state information and the application information.

9. The information processing apparatus according to claim 1, wherein the nearby wireless communication is defined by an electromagnetic induction communication, and the short range wireless communication is a Bluetooth communication.

10. The information processing apparatus according to claim 1, wherein the capability information includes the application information, the application information indicates a name of the application, and said process execution means carries out a setting of the application, which executes a process based on the information delivered and accepted through the short range wireless communication.

11. An information processing method for an information processing apparatus, comprising:
controlling a first communication section, which can carry out a delivery and an acceptance of information to and from a different information processing apparatus positioned near to the information processing apparatus by a nearby wireless communication, to establish a connection for the nearby wireless communication;
acquiring setting information for a short range wireless communication which exhibits a wider communication range than the nearby wireless communication and capability information regarding a capacity of the information processing apparatus from the different information processing apparatus through the nearby wireless communication for which the connection is established;
controlling a second communication section, which carries out the short range wireless communication, based on the acquired setting information, to establish a connection for the short range wireless communication; and
executing a predetermined process based on information delivered to and accepted from the different information processing apparatus based on the acquired capability information and including at least one of behavior setting information which specifies a behavior of the information processing apparatus or the different information processing apparatus, connection apparatus information regarding an apparatus connected to the different information processing apparatus, apparatus state information indicative of a state of the different information processing apparatus and application information regarding an application which can be executed by the different information processing apparatus, wherein the capability information includes the apparatus state information, the apparatus state information indicates an existing power supply state of the different information processing apparatus, the executing executes the predetermined process, through the short range wireless communication, based on the existing power supply state,
the predetermined process provides a service to the different information processing apparatus based on the existing power supply state of the different information processing apparatus, and the service includes generating electromagnetic waves based on the existing power supply state of the different information processing apparatus.

12. A non-transitory computer readable storage medium having a program stored thereon that, when executed on a processor, causes an information processing apparatus to execute a process which comprises:
controlling with the processor a first communication section, which can carry out a delivery and an acceptance of information to and from a different information processing apparatus positioned near to the information processing apparatus by a nearby wireless communication, to establish a connection for the nearby wireless communication;
acquiring setting information for a short range wireless communication which exhibits a wider communication range than the nearby wireless communication and capability information regarding a capacity of the information processing apparatus from the different information processing apparatus through the nearby wireless communication for which the connection is established;
controlling a second communication section, which carries out the short range wireless communication, based on the acquired setting information, to establish a connection for the short range wireless communication; and
executing a predetermined process based on information delivered to and accepted from the different information processing apparatus based on the acquired capability information and including at least one of behavior setting information which specifies a behavior of the information processing apparatus or the different information processing apparatus, connection apparatus information regarding an apparatus connected to the different information processing apparatus, apparatus state information indicative of a state of the different information processing apparatus and application information regarding an application which can be executed by the different information processing apparatus, wherein the capability information includes the apparatus state information, the apparatus state information indicates an existing power supply state of the different information processing apparatus, the executing executes the predetermined process, through the short range wireless communication, based on the existing power supply state,
the predetermined process provides a service to the different information processing apparatus based on the existing power supply state of the different information processing apparatus, and the service includes generating electromagnetic waves based on the existing power supply state of the different information processing apparatus.

* * * * *